United States Patent [19]

Abumi

[11] Patent Number: 5,021,873
[45] Date of Patent: Jun. 4, 1991

[54] IMAGE SIGNAL PROCESSOR

[75] Inventor: Takao Abumi, Yaita, Japan

[73] Assignee: Sharp Kabushiki Kaisha, Osaka, Japan

[21] Appl. No.: 465,635

[22] Filed: Jan. 22, 1990

Related U.S. Application Data

[63] Continuation of Ser. No. 168,963, Mar. 16, 1988, abandoned.

[30] Foreign Application Priority Data

Mar. 16, 1987 [JP] Japan .................................. 62-61897
May 30, 1987 [JP] Japan .................................. 62-84305

[51] Int. Cl.$^5$ .......................... H04N 9/64; H04N 5/14
[52] U.S. Cl. .................................. 358/21 R; 358/160; 358/903
[58] Field of Search ..................... 358/13, 21, 160, 903

[56] References Cited

U.S. PATENT DOCUMENTS

| | | | |
|---|---|---|---|
| 4,148,070 | 4/1979 | Taylor ................................. | 358/160 |
| 4,258,385 | 3/1981 | Greenberg et al. ................... | 358/22 |
| 4,286,291 | 8/1981 | Taylor et al. ......................... | 358/13 |
| 4,400,717 | 8/1983 | Southworth et al. ................. | 358/13 |
| 4,589,020 | 5/1986 | Akatsuka ........................... | 358/21 R |
| 4,625,233 | 11/1986 | Harwood ............................. | 358/23 |
| 4,644,398 | 2/1987 | Shimoni ............................. | 358/140 |
| 4,689,823 | 8/1987 | Wojcik et al. ....................... | 358/160 |

FOREIGN PATENT DOCUMENTS 70718 6/1978 Japan ..................................... 358/13

Primary Examiner—John W. Shepperd

[57] ABSTRACT

An image signal processor includes a memory device for storing an image signal representative of a picture during one field period, an operating unit for generating a READ-OUT command necessary to read out contents stored in the memory device, a selector for selectively switching the memory device between a WRITE-IN READY condition and a READ-OUT READY condition, and a switching control unit for generating a control signal necessary to control the switching operation of the selector. The switching control unit is adapted to receive the READ-OUT command and a vertical synchronizing signal included in a composite video signal. The selector performs the switching operation in synchronism with the initial vertical synchronizing signal applied immediately after the READ-OUT command has been inputted.

7 Claims, 15 Drawing Sheets

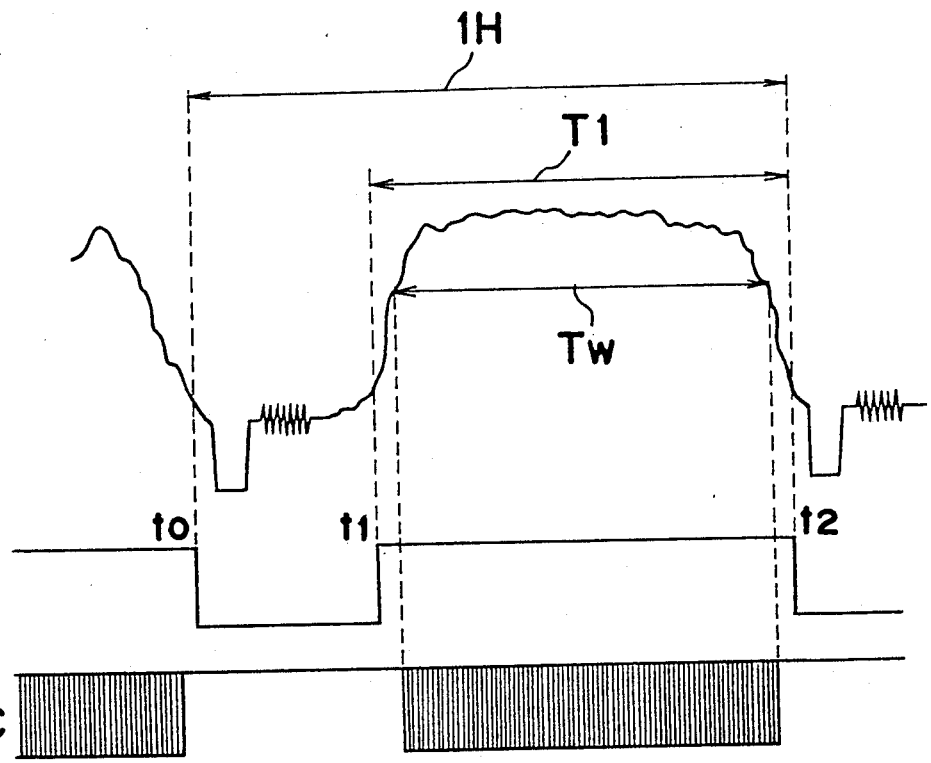
Fig. 2 (1)
Fig. 2 (2)
Fig. 2 (3)
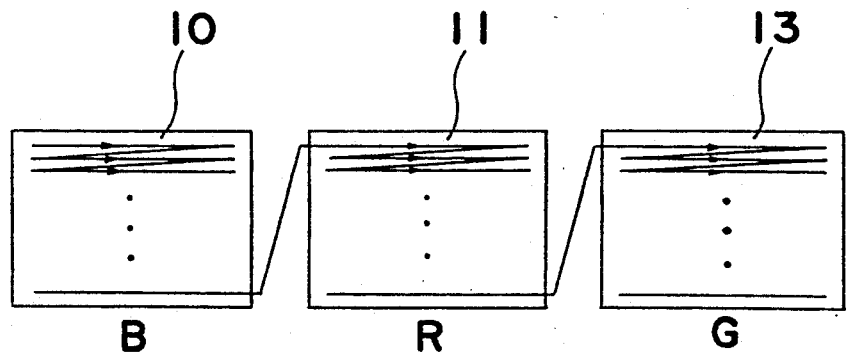
Fig. 3

Fig. 15
(A) Composite Color Video Signal 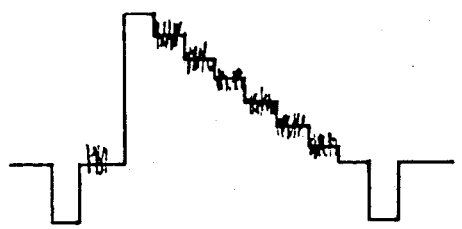
(B) Inverted Composite Color Video Signal 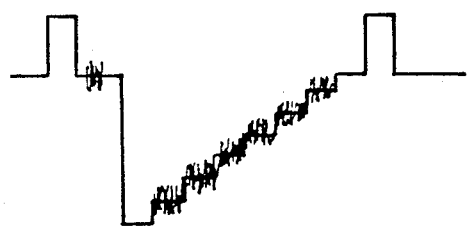
(C) B-Y Signal 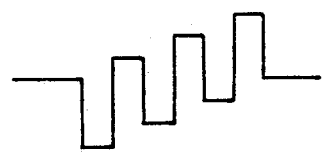
(D) R-Y Signal 
(E) G-Y Signal 
(F) $\overline{B}$ With Carrier 
(G) $\overline{R}$ With Carrier 
(H) $\overline{G}$ With Carrier 

IMAGE SIGNAL PROCESSOR

This application is a continuation of application Ser. No. 07/168,963 filed on Mar. 16, 1988, now abandoned.

BACKGROUND OF THE INVENTION

1. Field of the Invention

The present invention generally relates to an image signal processor and, more particularly, to a type of image signal processor used in connection with a video output device such as, for example, a television receiver set, a video tape player (VTR) or a video camera. The image signal processor stores signal outputted from the video output device and subsequently writes the stored video signal in a graphic memory of a personal computer in the form of a still or a frozen picture.

2. Description of the Prior Art

With the advent of widespread use of semiconductor memories, numerous image signal processors of the type referred to above have been proposed and has been made commercially available. When the image signal descriptive of one frozen picture is read in the personal computer through the image signal processor, an operator of the personal computer can perform an image analysis of the frozen picture or image processing such as enlargement or reduction of the frozen picture, and extraction or highlighting of one or more portions of the frozen pictures.

According to the prior art, an image signal processor is provided with a memory device for storing digitized image signals. When a WRITE-IN control signal or a READ-OUT control signal is supplied to the memory device, the image signal can be inputted to or outputted from the memory device, respectively.

Generally in the prior art image signal processor, when the image signal stored in the memory device is desired to be read out from the memory device for transfer to the personal computer, the following process takes place. Specifically, after an image signal representative of one frozen picture has been written in the memory device of the image signal processor, the image signal processor transmits a signal to the personal computer notifying the personal computer that the image signal has been stored in the memory device. The personal computer subsequently interrogates the image signal processor if the image signal stored in the memory device can be read out from the memory device. When the image signal processor is so interrogated, a READY signal is transmitted to the personal computer notifying the personal computer that the image signal in the memory device is ready to be read out therefrom. After this interrogation, the image signal is transferred onto the personal computer. The image signal read out from the memory device is then stored in an internal graphic memory in the personal computer.

According to the prior art, in order for the image signal stored in the memory device to be transferred onto the personal computer, a plurality of interrogations must be made between the image signal processor and the personal computer, and a relatively long time is required to complete the transfer of the image signal to the personal computer.

The prior art image signal processor also has another problem associated with the write-in operation of the image signal. Specifically, when the frozen color picture which is composed of, for example, red, green and blue is desired to be reproduced in a color as faithful as possible to the color of the original video image, it is generally recognized that a resolving power of at least 4 to 8 bits (16 to 256 colors) is required for each color of the frozen color picture. This means that the memory device should have a large memory capacity to store a number of color image data. While the price in the market of semiconductor memories has been lowering because of mass-production, the memory device used in the image signal processor is, in practice, composed of a number of memory chips and, therefore, an increased number of the memory chips may result not only in a cost increase of the image signal processor, but also in a size increase of the image signal processor and the associated circuit components.

On the other hand, in the field of facsimile technology in which the input image signal is digitized to provide a frozen picture, a DITHER process is generally used. According to the DITHER process, the input image signal representative of the original image is inputted to a comparator whose threshold value is variable stepwise so that a plurality of digitized images of different gradations can be obtained. The digitized images of different gradations are then properly combined together to provide a single frozen picture having continuously varying gradations.

However, this technique has posed a problem in that the use of a circuit for varying the threshold value is required which tends to make the image signal processor as a whole bulky in size. Also, a process of combining the digitized images together to provide the single frozen picture is complicated, and a real-time accomplishment of the process is hampered.

SUMMARY OF THE INVENTION

Accordingly, the present invention has been devised with a view to substantially eliminate the above discussed problems inherent in the prior art image signal processors and provides as an essential object an improved image signal processor of a type capable of transferring the image signal stored in the memory device at a high speed.

Another important object of the present invention is to provide an improved image signal processor of the type referred to above which makes use of the memory device of a reduced memory capacity and which can provide a frozen color picture substantially faithful in color to the color of a original image.

A further object of the present invention is to provide an improved image signal processor of the type referred to above, which is simple in structure and capable of providing the frozen picture of acceptable gradations.

In order to accomplish these objects, the present invention provides an improved image signal processor which includes a memory for storing an image signal representative of a picture during one field period; an operating device for generating a READ-OUT command that is necessary for reading out contents stored in the memory, a switch for selectively switching the memory means between a WRITE-IN READY condition and a READ-OUT READY condition; and a switching controller for generating a control signal that is necessary for controlling the switching operation of the switch means. The switching controller is adapted to receive the READ-OUT command and a vertical synchronizing signal included in a composite video signal. The switch performs a switching operation in synchronism with the initial vertical synchronizing signal applied immediately after the READ-OUT command has been inputted.

In the image signal processor according to the present invention, when the image signal stored in the memory means is to be read out from the memory by the operating device, the READ-OUT command is supplied from the operating device; to the switching controller. The switching control means is adapted to receive the vertical synchronizing signal included in the composite video signal supplied to the image signal processor. Accordingly, when the READ-OUT command is supplied from the operating device to the switching controller, the control signal can be outputted from the switching controller in synchronism with the initial vertical synchronizing pulse applied immediately after the READ-OUT command has been inputted. The controller signal outputted from the switching control in this way is applied to the switch to control the switching operation performed by the switch. In response to the control signal, the switch selectively brings the memory into the WRITE-IN READY condition and the READ-OUT READY condition.

Accordingly, in the image signal processor according to the present invention, it is possible to selectively bring the memory into the WRITE-IN READY condition and the READ-OUT READY condition in synchronism with the vertical synchronizing signal included in the input composite video signal by causing the operating device to apply the READ-OUT command. Also, since the outputting of the READ-OUT command from the operating device is sufficient for the memory to be brought into the READ-OUT READY condition, the image signal stored in the memory can be read out therefrom at a high speed.

BRIEF DESCRIPTION OF THE DRAWINGS

These and other objects and features of the present invention will become clear from the following description taken in conjunction with preferred embodiments thereof with reference to the accompanying drawings, in which like parts are designated by like reference numerals and in which:

FIGS. 2(1)-2(3) is a timing chart used to explain the operation of a field memory device used in the image signal processor during the WRITE-IN mode;

FIG. 3 is a timing chart used to explain the operation of the field memory device during the READ-OUT mode;

FIG. 15 is a diagram showing waveforms of various signals appearing in the circuit of FIG. 14;

DETAILED DESCRIPTION OF THE EMBODIMENTS

Figure 1:
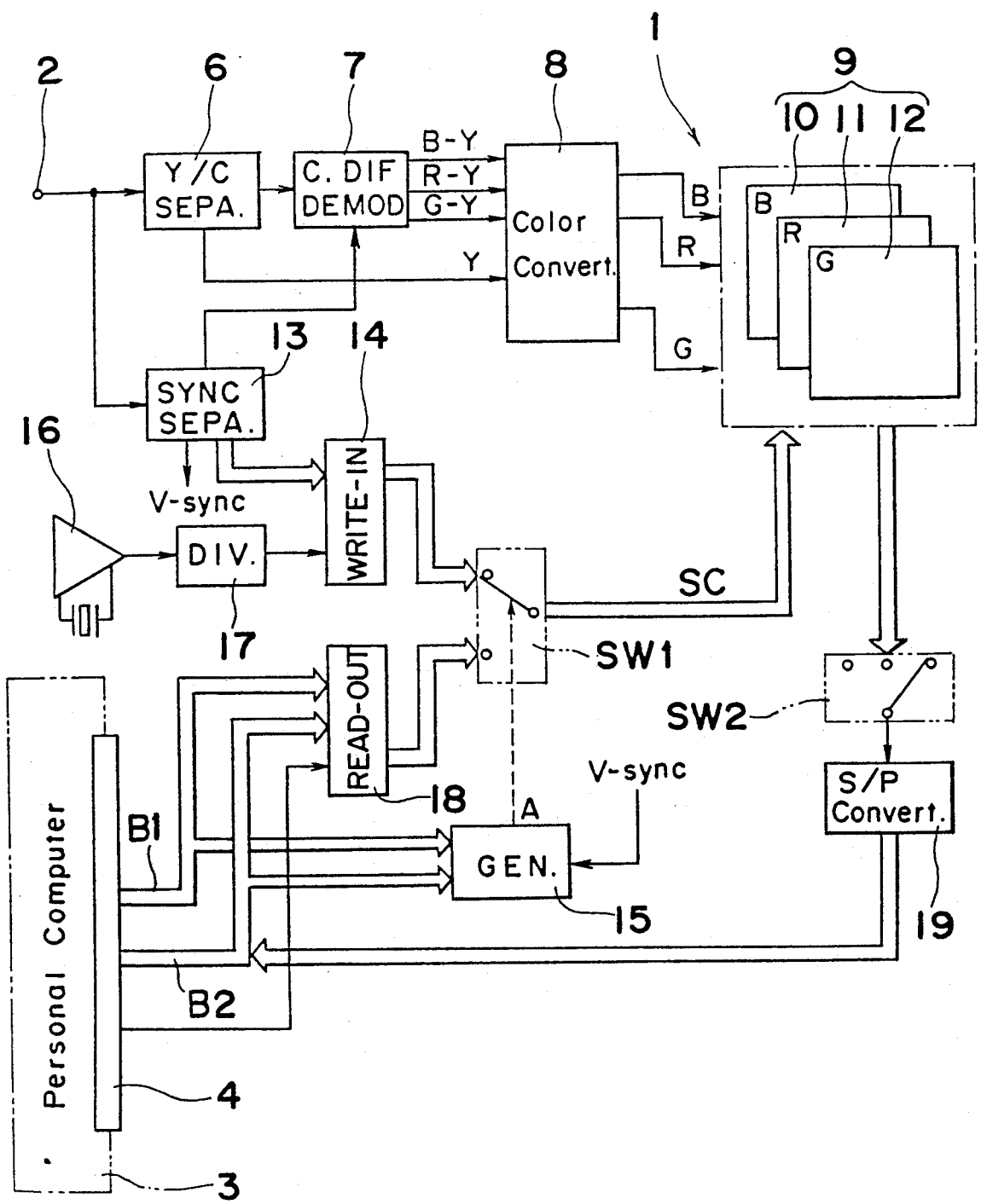
FIG. 1 is a schematic circuit block diagram showing an image signal processor according to a first embodiment of the present invention.

A. Still Picture Data Write/Read System:

Referring first to FIG. 1, there is illustrated a circuit block diagram of a still picture read/write system 1. The system 1 shown therein includes an input terminal 2 adapted for being connected with a video output device, for example, a television receiver set or a video tape player, and for being connected a composite video signal that is applied from the video output device. A connector 4 is adapted to be connected with an address bus and a data bus of a personal computer 3.

The composite video signal inputted to the input terminal 2 is fed to a luminance signal separator 6 operable to separate signals from a luminance signal Y which is in turn applied to a color difference signal demodulator 7 for providing B-Y, R-Y and G-Y color difference signals. The luminance signal Y from the luminance signal separator 6 and the three color difference signals from the color difference signal demodulator 7 are subsequently fed to a color difference/primary color converter 8 operable to convert the color difference signals into three primary color signals, that is, B, R and G signals, which are representative of the three primary colors, blue, red and green. The primary color signals are in turn supplied to a field memory device 9 in which the primary color signals are digitized for storing therein in the form of a still picture corresponding to one field.

The field memory device 9 includes three field memories 10, 11 and 12 for the respective B, R and G signals. Each of the field memories 10 to 12 employ a serial access input and output system. Each of the field memories 10 to 12 is of a memory construction having 320 rows by 700 columns, a memory area having a sufficient size to accommodate one picture, a one-line buffer memory area and a row address counter. When each of these field memories 10 to 12 applied with a serial clock signal as will be described later are incrementally shifted by a memory cell in a parallel direction to the columns, and, are applied with an increment pulse signal, one line is shifted a parallel direction to the row. For the purpose of the description of the preferred embodiment of the present invention, each memory cell of each of the field memories 10 to 12 is assumed to be capable of storing one bit.

The composite video signal applied to the input terminal 2 is also supplied to a sync separator 13 operable for separating horizontal and vertical synchronizing signals from the composite video signal. The outputs from the sync separator 13 is supplied to the color difference signal demodulator 7 for clamping and also to a WRITE-In control circuit 14. The vertical synchronizing signal separated from the composite video signal by the sync separator 13 is also applied to a control signal generator 15 as will be described later.

The WRITE-IN control circuit 14 is adapted to receive a clock signal through a divider 17 which has been generated from a WRITE-IN clock signal oscillator 16 having an oscillating frequency of, for example, 28.636 MHz. The WRITE-IN control circuit 14 is operable to synthesize a plurality of WRITE-IN control signals on the basis of the synchronizing signals, outputted from the sync separator 13 and the clock signal generated from the clock signal oscillator 16. These WRITE-IN control signals are supplied to the field memory device 9 through a READ-OUT/WRITE-IN mode selector switch SW1. The B, R, and G signals outputted from the color converter 8 are digitized and written in the field memory 9 on the basis of the WRITE-IN control signals. The details of the WRITE-IN operation will be described later.

B. Still Picture Data Reading

The system 1 has an address bus B1 and a data bus B2 adapted for being connected with the address bus and the data bus of the personal computer 3 through the connector 4. Output signals from the personal computer 3 are supplied through the respective buses B1 and B2 to a READ-OUT control circuit 18 and also to the control signal generator 15. The READ-OUT control circuit 18 is also adapted to receive a clock signal from the personal computer 3 via the connector 4 having a frequency of, for example, 4 MHz which is used within the domain of the personal computer 3. The READ-OUT control circuit 18 is operable to synthesize a plurality of READ-OUT control signals on the basis of the outputs from the personal computer 3 and the clock signal. These READ-OUT control signals are supplied to the field memory device 9 through a READ-OUT/-WRITE-IN mode selector switch SW1.

When these READ-OUT control signals are supplied to the field memory device 9, B, R and G color data stored in the respective field memories 10 to 12 associated respectively with the B, R and G signals are sequentially outputted to a primary color signal selector switch SW2. The primary color signal selector switch SW2 is controlled by a switching control signal supplied from the personal computer 3 to sequentially output blue color data, red color data and green color data to a serial/parallel converter 19 in a specific order, for example, in the order specified above.

The serial/parallel converter 19 is operable to convert each of the color data into respective parallel data which is in turn outputted to the personal computer 3 through the data bus B2 for storage in a graphic memory (not shown) built in the personal computer 3. After the image signal is stored in the graphic memory in the manner described hereinabove, the image can be processed by operating the personal computer 3 in the usual manner well known to those skilled in the art.

FIG. 2 illustrates a timing chart used to explain the operation of the field memory device 9. FIG. 2(1) illustrates a waveform of a portion of the composite video signal corresponding to one horizontal scanning period 1H. A time span between timing t0 and timing t1 represents a horizontal blanking period, and a time span T1 between timing t1 and timing t2 represents a duration of a video signal carrying picture information. (See, FIG. 2(2)). In the illustrated instance, a serial clock signal SC, shown in FIG. 2(3), is applied to the field memory device 9 to which the composite video signal of the waveform described above is supplied. Therefore, during a WRITE-IN period Tw within the duration T1 of the video signal, the analog video signal is digitized and written in the field memory device 9 in the form of serial data.

Hereinafter, the READ-OUT operation of the field memory device 9 will be described. The B, R and G color data written, i.e., stored, in the field memory device 9 are supplied to the personal computer 3 through the data bus B2. The B, R and G color data written in the respective field memories 10 to 12 associated respectively with the B, R and G signals are sequentially switched by the selector switch SW2 in order of blue color data followed by the red color data followed by green color data and are in urn outputted to the data bus of the personal computer 3 after having been converted by the serial/parallel converter 19 into parallel color data. More specifically, when the data written in the field memory device 9 are to be read out, the converter 19 converts the data, serially supplied from the field memory 10 for the B signal, from the very beginning of such serially transmitted data into 8-bit parallel data which are then outputted to the personal computer 3. When all the blue color data written in the field memory 10 have been read out in this manner, 8-bit data are read out from the very beginning of the field memory 11 for the R signal. Similarly, 8-bit data are read out from the very beginning of the field memory 12 for the G signal. After all of the color data stored in the field memory device 9 have been completely read out in this way, the reading of one still picture is completed. (See FIG. 3). It is eventually pointed out that the reason for the employment of such a reading method is because the data bus in the personal computer 3 has only an 8-bit capacity.

Figure 4:
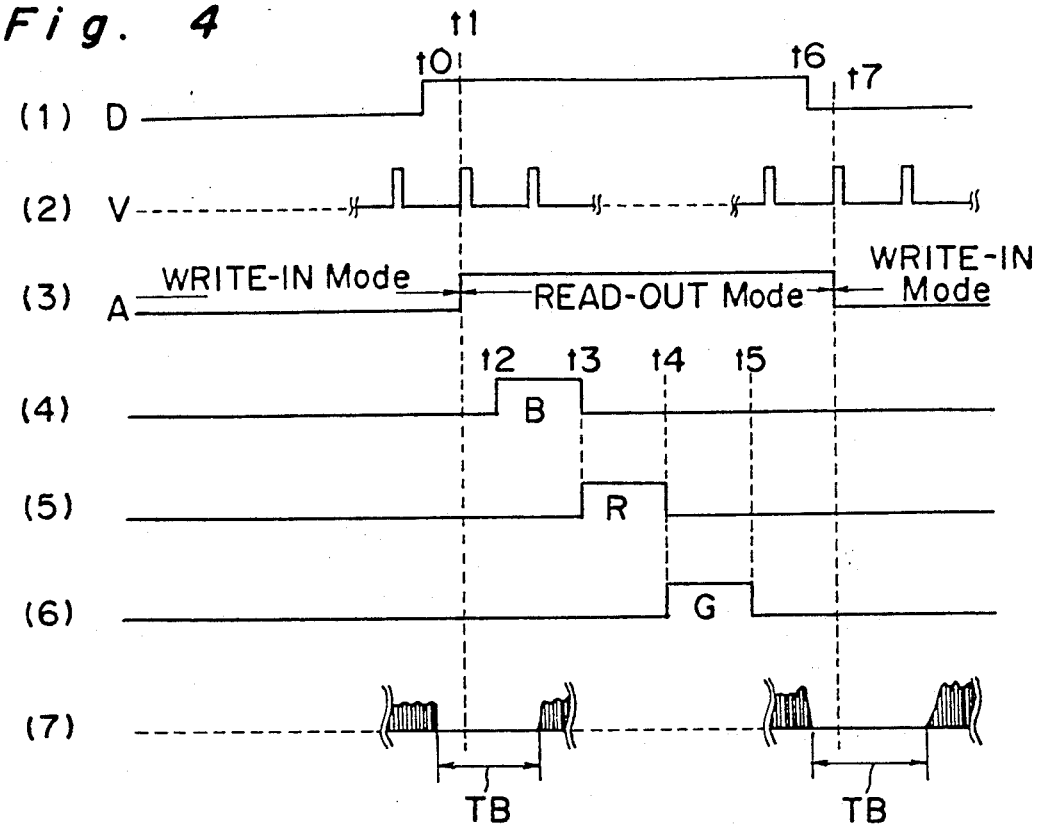
FIG. 4 is a timing chart used to explain the operation of a selector switch used in the image signal processor.

FIG. 4 illustrates a timing chart used to explain the principle of operation of the system in the illustrated instance. Referring to FIG. 4 in combination with FIGS. 1 to 3, the operation of the selector switch SW1 will now be described.

The selection between the READ-OUT mode and the WRITE-IN mode of the image signal processor 1 is accomplished by the selector switch SW1. More specifically, when the selector switch SW1 is in a position for setting the processor in the WRITE-IN mode, the WRITE-IN control signals outputted from the WRITE-IN control circuit 14 are supplied to the field memory device 9. On the other hand, when the selector switch SW1 is moved to set the processor in the READ-OUT mode (on the side of the personal computer 3), the READ-OUT signals outputted from the READ-OUT control circuit 18 are supplied to the field memory device 9.

Figure 5:
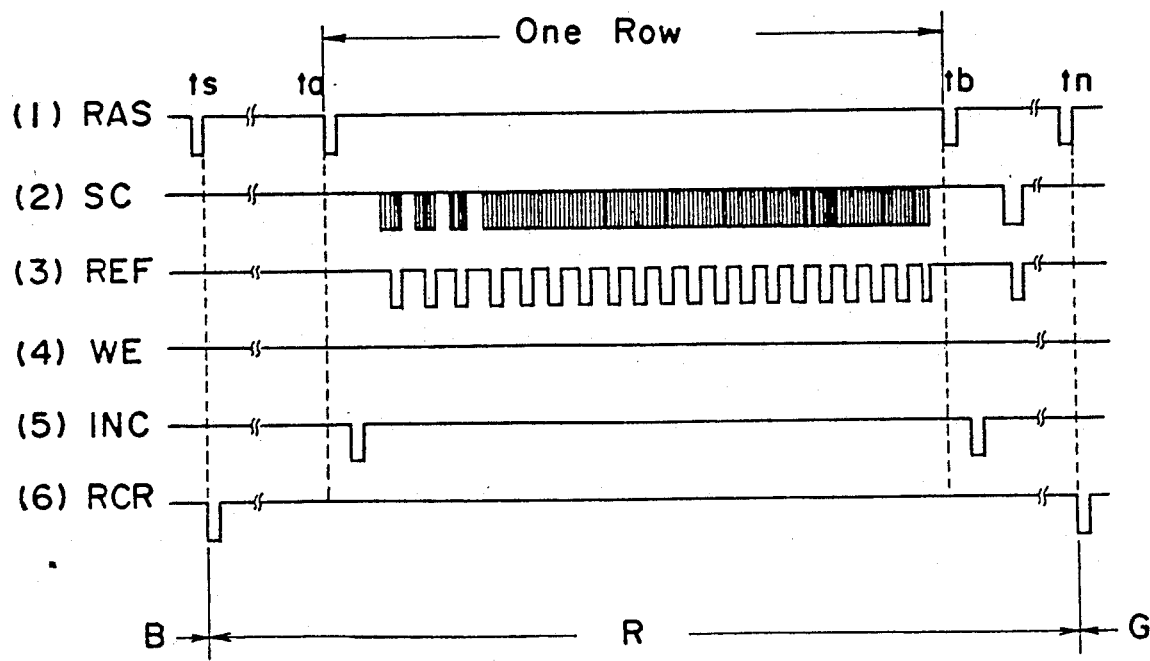
FIG. 5 is a timing chart illustrating a READ-OUT control signal outputted from a READ-OUT control circuit used in the image signal processor.

When the selector switch SW1 is in a position for setting the processor in the READ-OUT mode, the READ-OUT control circuit 18 supplies six types of READ-OUT control signals including, for example, a READ-OUT/WRITE-IN operation control signal RAS, the previously mentioned serial clock signal SC, a refresh control signal REF, and enable signal WE, an increment signal INC and a row reset signal RCR, as shown by signals (1) to (6) in FIG. 5, respectively, to the field memory device 9 through the selector switch SW1 so that the data stored in the field memory device 9 can be read out therefrom.

By way of example, during a period between time ts and time tn shown in FIG. 5, the red color data for each still picture are read out from the field memory 11 for the R signal. During a period between time ta and time tb, the red data for one row are serially read out in response to the serial clock signal SC and the refresh control signal REF.

The switching operation of the selector switch SW1 is controlled by a switching control signal A outputted from the control signal generator 15. More specifically, when the switching control signal A is in a low level state, the WRITE-IN mode is established, but when the signal A is in a high level state, the READ-OUT mode is established. (See the waveform (3) shown in FIG. 4).

The control signal generator 15 includes, for example, a D-type flip-flop and is operable to output not only the control signal A, but also a clock switching signal used to control the division cycle of the divider 17. As hereinbefore described, the vertical synchronizing signal V outputted from the sync separator 13 is applied to the control signal generator 15. (See the waveform (2) shown in FIG. 4).

Assuming that the processor 1 is set in the WRITE-IN mode, and in the event that a command necessary to set the processor 1 in the READ-OUT mode is generated from the personal computer 3, a high level control signal D is supplied from the personal computer 3 to the control signal generator 15. By way of example, when the control signal D is rendered to be in a high level state at a time t0 as shown by the waveform (1) in FIG. 4, the switching control signal A is set to a high level state in response to the set-up of one of the vertical synchronizing pulses V, which has been applied immediately after the set-up of the control signal D to the high level state, and the high level state of the switching control signal A is subsequently maintained.

As the switching control signal A is set to the high level state, the selector switch SW1 is brought in position to set the processor 1 in the READ-OUT mode, thereby permitting the data in the field memories 10 to 12 to be read out sequentially. More specifically, during a period from a time t2 to a time t3 shown in FIG. 4, the blue color data are first supplied to the personal computer 3. During a subsequent period from the time t3 to a time t4, and during a period from the time t4 to a time t5, the red color data nd the green color data are successively and sequentially supplied to the personal computer 3, respectively. In this way, at the time t5, the still picture data for one still picture which have been written in the field memory device 9 are completely read out from the field memory device 9 and transferred to the personal computer 3.

As hereinabove described, the switching between the WRITE-IN and READ-OUT modes can be accomplished when the control signal D transmitted from the personal computer 3 is brought in a high level state. The effective timing of this switching is synchronized with the set-up of one of the vertical synchronizing pulses which is applied immediately after the control signal D has been brought in the high level state. Specifically, the switching into the READ-OUT mode is carried out during a vertical blanking period TB as shown in the waveform (7) in FIG. 4.

Figure 7:
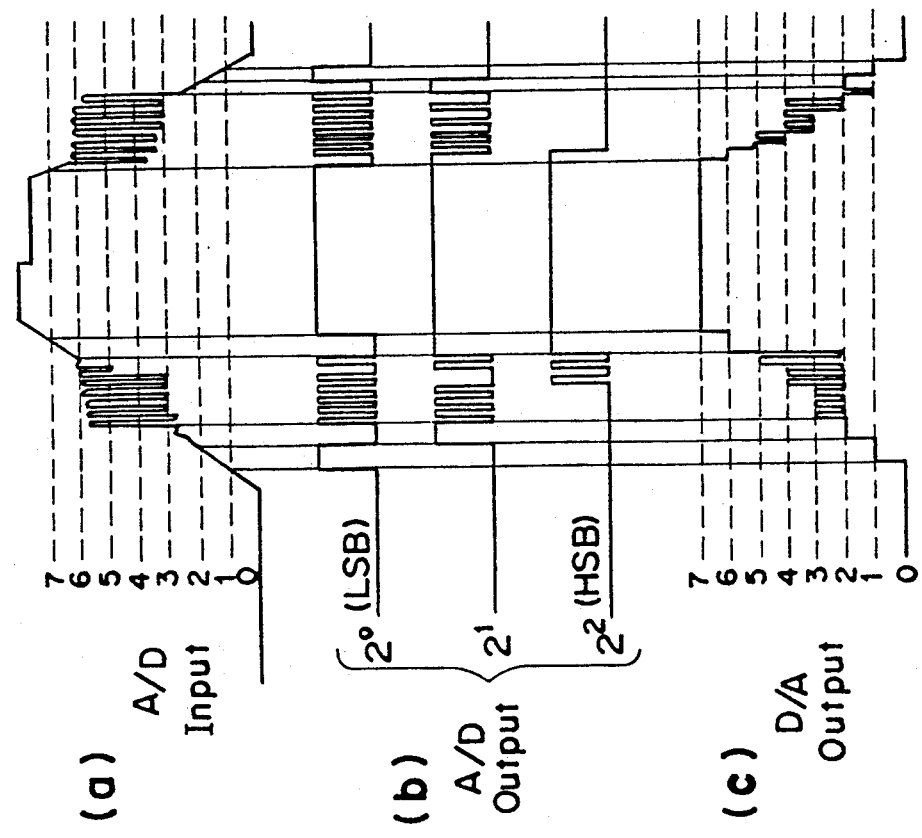
FIG. 7 is a schematic diagram used to explain a different image signal processing method according to the present invention.

Upon the completion of the read-out of the image signal, the personal computer 3 causes the control signal D to be in a low level at a time t6 wherefore the switching control signal A, which is an output from the control signal generator 15, is in a low level state in response to the set-up of another one of the vertical synchronizing pulses V which is applied immediately thereafter, i.e., at a time t7 shown in FIG. 7, and cause the selector switch SW1 to set the processor 1 in the WRITE-IN mode. It is to be noted that the time t7 is immediately after the color data in the field memory device 9 have been read out from the field memory device 9, and no data is written in the field memory device 9. Accordingly, after the time t7, the image signal subsequently imputed can be written again in the field memory device 9 in the form of a still picture.

The reason for switching the READ-OUT mode during the vertical blanking period TB is for the purpose of accurately reading out the video signal corresponding to one picture. If this switching is not effected during the vertical blanking period TB, the picture being reproduced on a screen may be switched over to a different picture without being completely reproduced. The time required to complete the read-out of one picture is determined by the timing at which the control signal D from the personal computer 3 is brought in the high level state. More specifically, since the start and end of the period during which the information read-out is carried out lie within the time span between the neighboring vertical blanking periods, a wait time occurs before and after the read-out operation. In any event, in the illustrated instance, the time required to complete the information read-out may be 0.2 second on an average.

The time required to complete the write-in operation which takes place when the processor 1 is set in the WRITE-IN mode corresponds to one field period, that is, 1/60 second. As hereinbefore described, upon the completion of the read-out operation, the processor 1 is switched into the WRITE-IN mode to permit the color data corresponding to one still picture to be again written in the field memory device 9.

Also, the timing at which the processor 1 is switched onto the WRITE-IN mode is carried out during the vertical blanking period. Accordingly, the personal computer 3 can render the control signal D to be in a high level state for any timing. More specifically, regardless of when the personal computer 3 generates a command required to bring the control signal D into the high level state, the color data corresponding to one still picture can be always read out accurately. Moreover, the switching of the image signal processor 1 into the READ-OUT mode can be reliably accomplished without interrogations being carried out such as in the prior art processor. Accordingly, the still picture represented by the video signal can be written at a high speed in the graphic memory device built in the personal computer.

As hereinbefore described, in the image signal processor according to the present invention, when the memory is desired to be brought in the READ-OUT READY condition, this condition can be accomplished merely by causing the operating device to output the READ-OUT command. Accordingly, the necessity of frequent interrogations between the processor and the operating device that are required in the prior art processor can be minimized, and the read-out operation of the memory can be carried out a high speed. Moreover, since the timing at which the switching between the WRITE-IN and READ-OUT modes takes placed in synchronism with the vertical synchronizing signal and without relying on the timing at which the READ-OUT command is transmitted, the video signal corresponding to one field period can be always read out accurately.

C. Still Picture Data Writing:

A first embodiment of an image signal processing according to the present invention will now be described.

Figure 6:
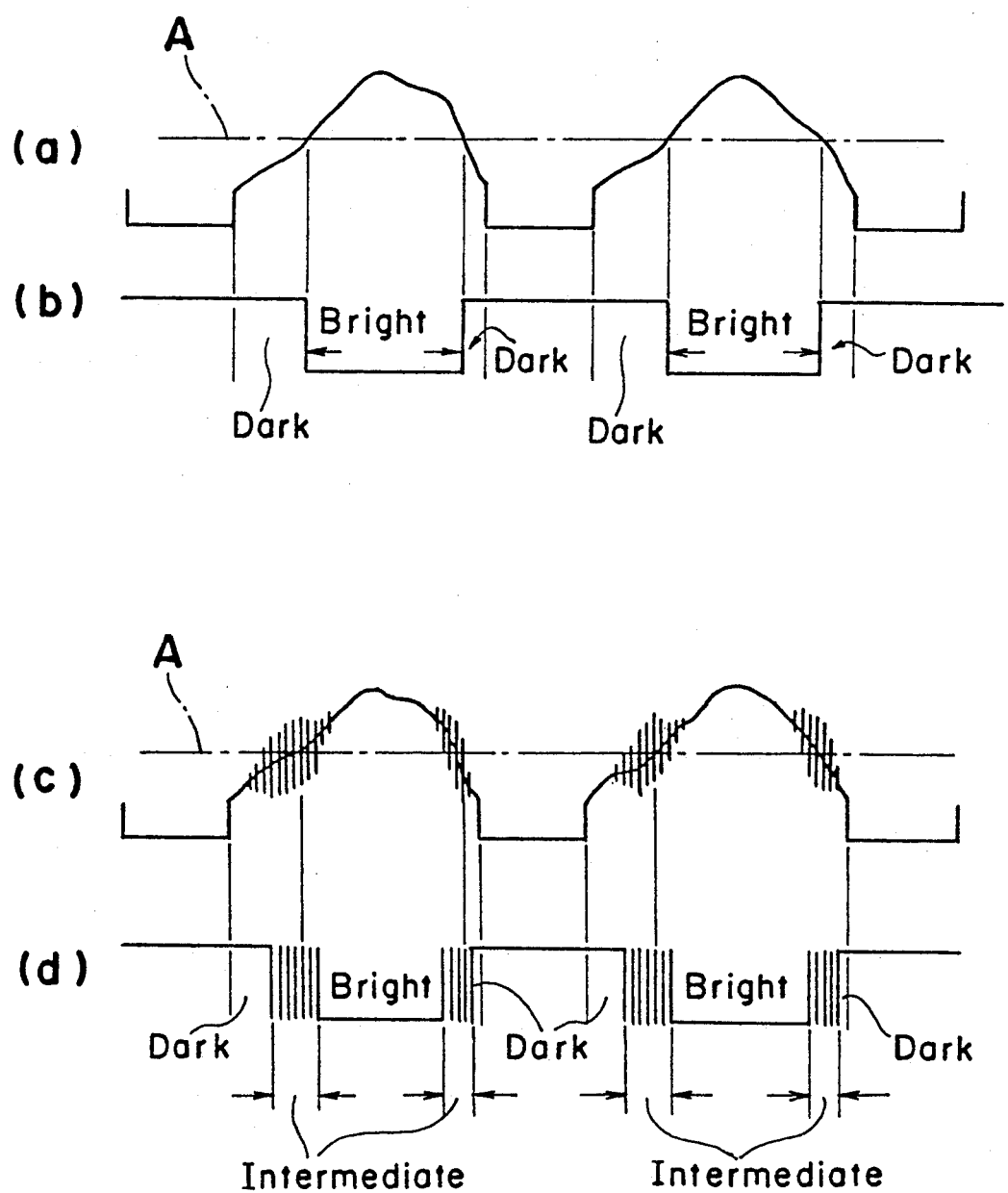
FIG. 6 is a schematic diagram used to explain an image signal processing method according to the present invention.

Referring to FIG. 6, a waveform (a) shown therein represents that of the image signal carrying a still picture, wherein a chain line A represents an average level of the image signal. Those portions of the image signal which are located around the average level denoted by the chain line A are superimposed with clock pulses whose waveforms are shown by (c) in FIG. 6. When the image signal superimposed with the clock pulses is inputted to a switching element having a threshold value equal to the average level, a digitized signal of a waveform as shown by signal (d) in FIG. 6 can be obtained.

For the purpose of comparison, a digitized signal obtained by inputting the image signal, which is not superimposed with the clock pulses, to the same switching element is shown by signal (b) in FIG. 6. As can be understood from FIG. 6, a portion of the image signal which is of a level higher than the average level represents a bright region while a portion of the image signal which is of a level lower than the average level represents a dark region. On the other hand, according to the waveform (d), a portion in which the bright and dark regions alternates finely, that is, a region of intermediate gradations shows up between the bright and dark regions. By way of example, where the still picture image is presented in black and white, the region of intermediate gradations is shown in gray. Also, where the input image signal is a red color signal, the region of intermediate gradations is represented by a repetition of red and black colors and is, therefore, represented by a brown color which is an intermediate color between the red color and the black color. The region of intermediate gradation is attributable to the clock pulses superimposed on the image signal in the manner as hereinabove described.

In view of the foregoing, if the digitized signal of the waveform (d) shown in FIG. 6 is sampled at a timing shorter than the cycle of the clock pulses and is then stored in, for example, a sufficient memory device having a memory capacity to accommodate one still picture, the digitized signal for the intermediate gradations can be read out at any desired time.

FIG. 7 illustrates another embodiment of the method for the present invention. According to the embodiment shown in FIG. 7, the image signal having portions superimposed with the clock pulses at the average level is divided into eight levels 0 to 7 so that it can be converted into a 3-bit digital signal as shown by waveform (a) in FIG. 7. A waveform (b) shown in FIG. 7 represents the 3-bit digital signal converted from the analog signal. A waveform (c) shown in FIG. 7 represents the 3-bit digital signal which has been further converted into an analog signal. In contrast thereto, waveforms associated with the image signal not superimposed with the clock pulses, which have been converted into the digital signal, are illustrated in FIG. 8.

Figure 8:
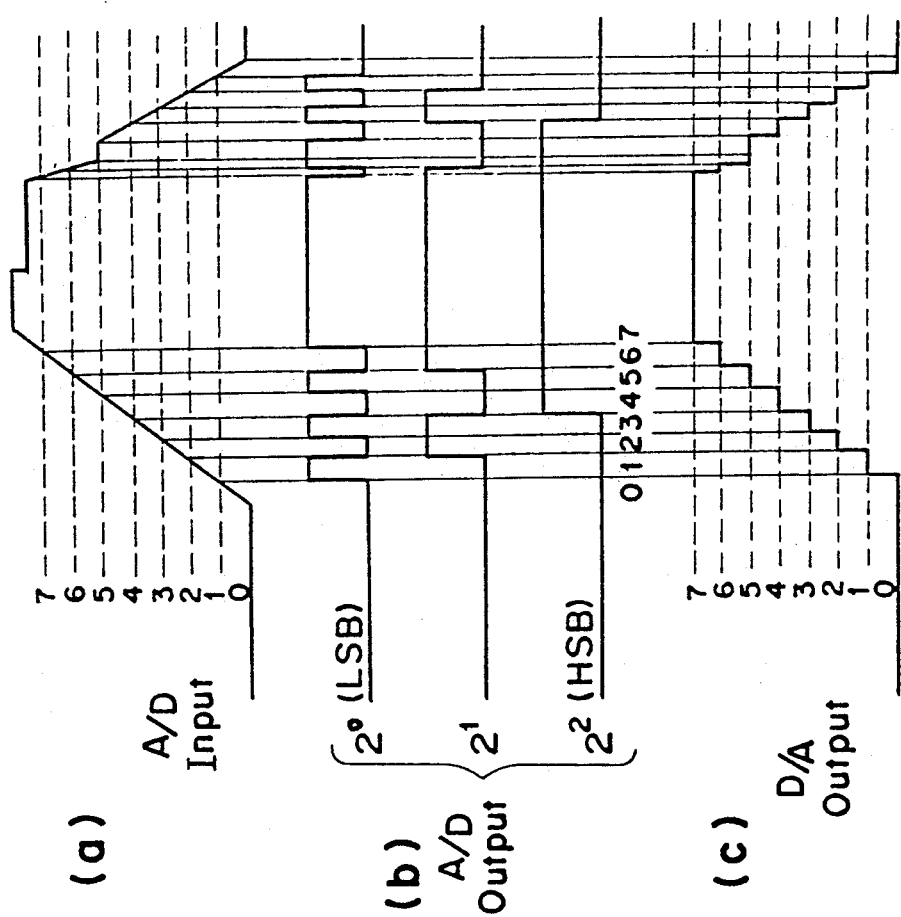
FIG. 8 is a schematic diagram used for the purpose of comparison with the image signal processing method shown in FIGS. 6 and 7, in which the image signal is not superimposed with clock pulses.

As can be readily understood from the comparison between the waveforms (c) shown in FIGS. 7 and 8, a component resulting from the image signal superimposed with the clock pulses fills up steps between gradations or the image signal so that the intermediate gradations or the intermediate colors can be displayed. Because of this, when the still picture is to be reproduced, the superimposition with the clock pulses achieves an effective result reproducing the still picture in a color as faithful as possible to the color of the original image. In other words, at portions where the clock pulses are superimposed, a resolving power can be equivalently increased. In order to increase the resolving power, the number of bits of the analog-to-digital converter is generally required to be increased. The present invention is effective for accomplishing a substantially faithful color reproduction, including the reproduction of intermediate gradations and intermediate colors, without requiring the number of bits of the analog-to-digital converter to be increased.

Figure 9:
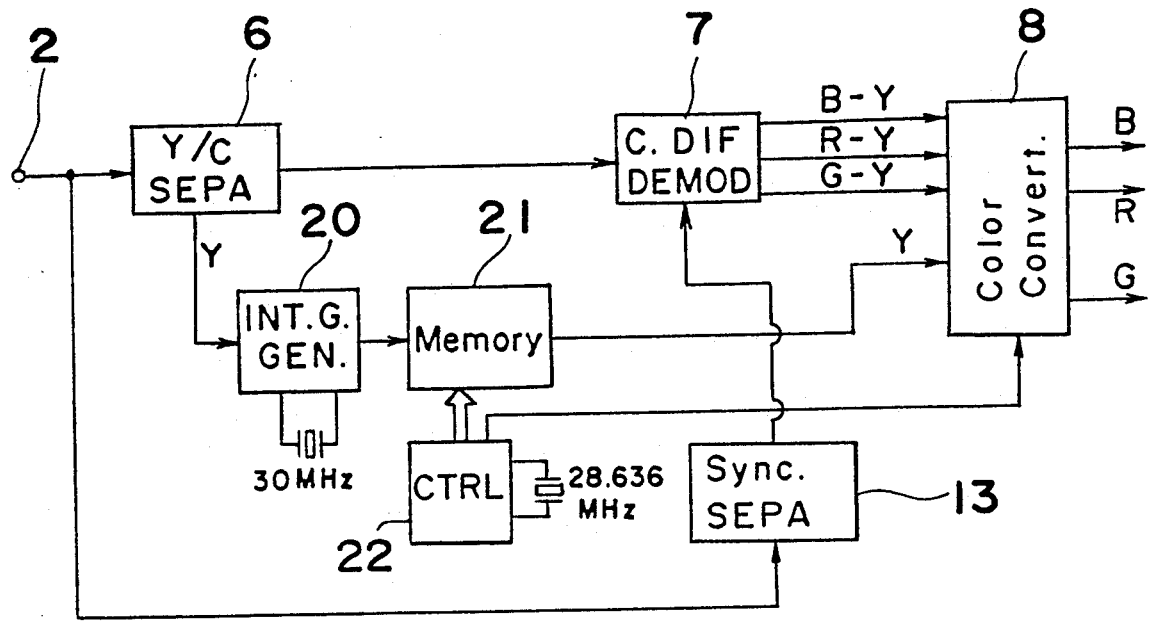
FIG. 9 is a schematic circuit block diagram showing the image signal processor according to a second embodiment of the present invention.

The image signal processor necessary to achieve the above described objective will now be described with particular reference to FIGS. 9 and 10.

Figure 10:
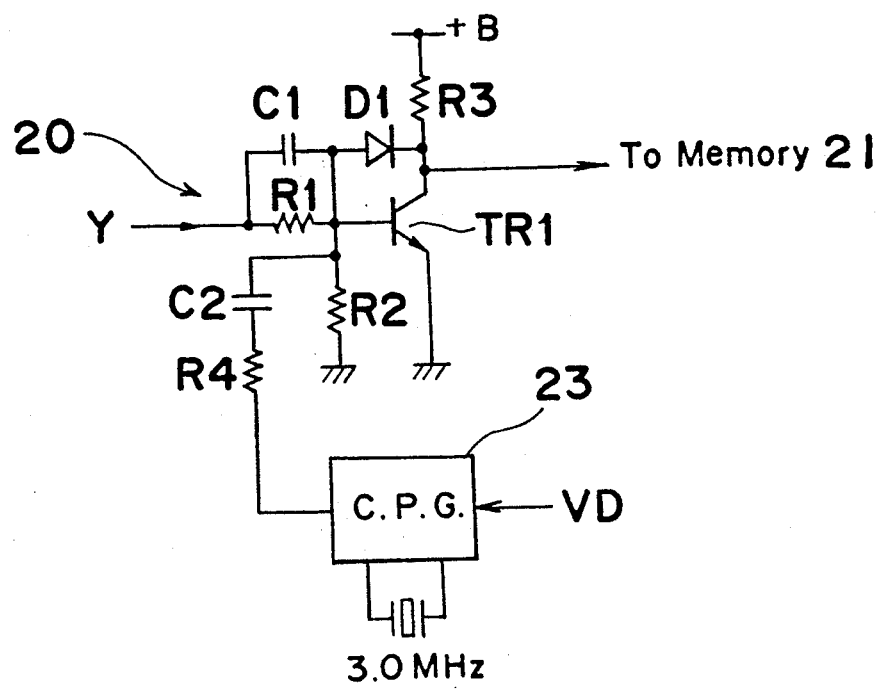
FIG. 10 is a circuit diagram showing the details of an intermediate gradation generator used in the image signal processor of FIG. 9.
Figure 11:
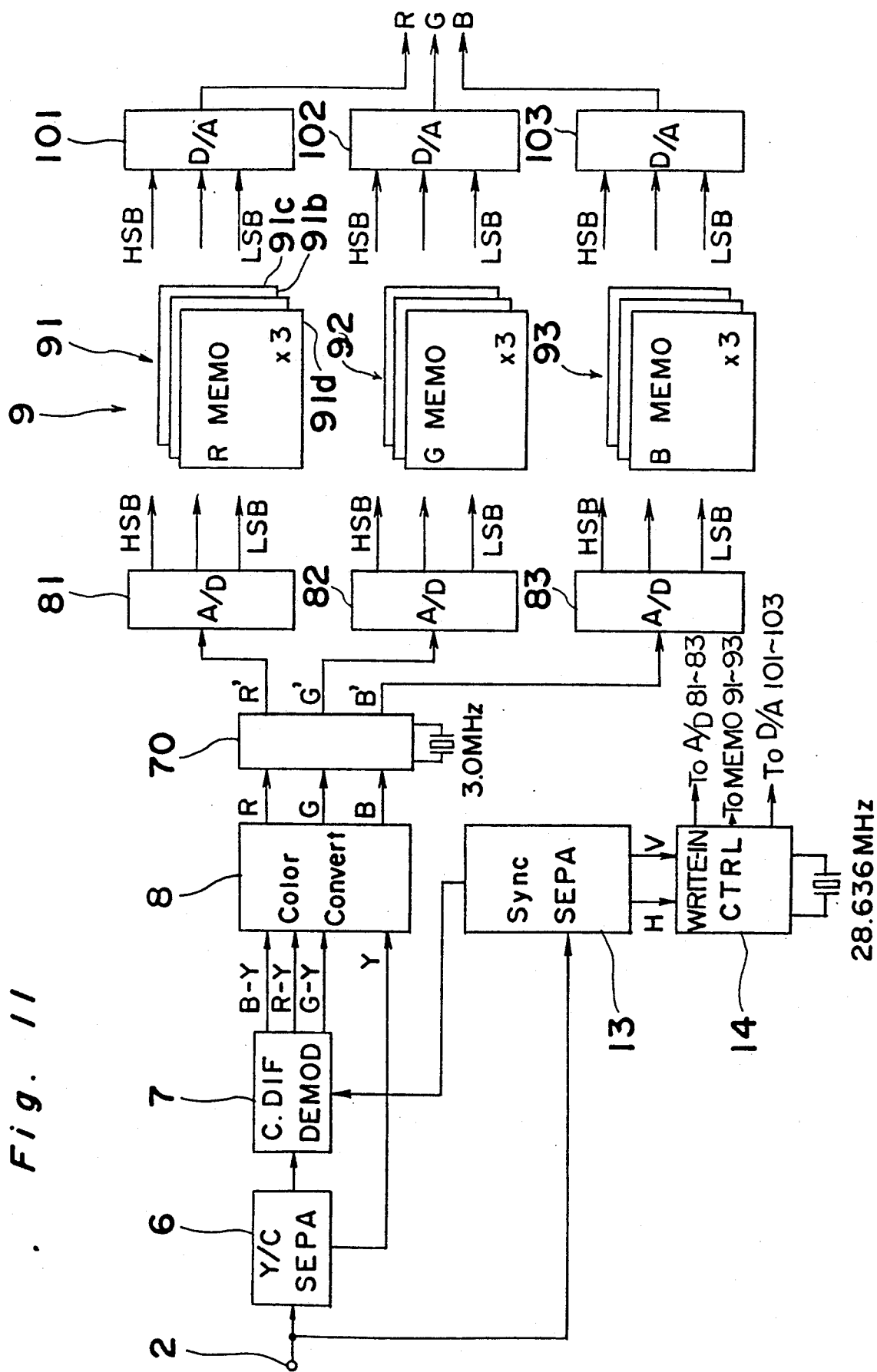
FIG. 11 is a schematic circuit block diagram showing the image signal processor according to a third embodiment of the present invention.

FIG. 10 illustrates a second embodiment of the image signal processor according to the present invention and FIG. 11 illustrates an intermediate gradation generator used in the circuit shown in FIG. 10.

The luminance signal as a video signal indicative of a still image is applied to an intermediate gradation generator 20. The intermediate gradation generator 20 includes, as best shown in FIG. 10, an NPN-type switching transistor TR1 having a threshold level substantially equal to the average level of the luminance signal of the still image. The transistor TR1 has a base to which a resistor R1 and a speed-up capacitor C1 are connected. A set-up improving diode D1 is connected between the base and the collector of the transistor TR1 in a forward direction. The base of the transistor TR1 is grounded through a resistor R2. The transistor TR1 has its collector connected with a direct current source line +B through a resistor R3 and its emitter connected to the ground. The base of the transistor TR1 is also connected with a clock pulse generator 23 through a series circuit having a DC element capacitor C2 and a resistor R4. The clock pulse generator 23 is of a type capable of generating clock pulses of 3 MHz in frequency and is adapted to receive a vertical drive signal operable to lock the oscillation of the clock pulse generator 23.

An output from the intermediate gradation generator 20 of the construction described with particular reference to FIG. 10 is supplied to a memory unit 21 which is controlled by a control unit 22. Contents stored in the memory unit 21 are read out to the color difference/primary color converter 8 from which the image data is outputted to an external display device.

The image signal processor according to the second embodiment of the present invention shown in and described with reference to FIGS. 9 and 10 will now be described.

Let it be assumed that the luminance signal of the still image having the waveform shown by signal (a) in FIG. 6 is applied to the base of the switching transistor TR1.

The 3 MHz clock pulses generated from the clock pulse generator 23 are also applied to the base of the transistor TR1 through the resistor R4 and the capacitor C2. Since the direct current component of the clock pulses are inhibited by the action of the capacitor C2, the level of the clock pulses to be superimposed on the luminance signal varies with the level of the luminance signal. In other words, the amplitude of the clock pulses superimposed on the luminance signal is high for the average level of the luminance signal, but low for a lower or a higher level of the luminance signal as can be understood from the waveform (c) shown in FIG. 6.

Since the transistor TR1 has a threshold level substantially equal to the average level of the luminance signal, a digitized signal of the luminance signal, which is an output from the transistor TR1, will represent such a waveform having an intermediate portion, as shown by (d) in FIG. 6.

This digitized signal is then supplied to the memory unit 21. The memory unit 21 is controlled by the control unit 22 to sample out the digitized signal at a timing (28.636 MHz in this instance) shorter than the cycle of the clock pulses superimposed on the luminance signal for storing the luminance signal corresponding to one still picture. The contents stored in the memory unit 21 are, in response to a control signal applied from the control unit 22, supplied to the external display device, for example, the personal computer 3, after having been converted into parallel signals as hereinbefore described. The still picture having intermediate gradations is then displayed through a cathode ray tube of the personal computer 3. At this time, as hereinbefore described, the clock pulses superimposed on the luminance signal are synchronized with the vertical drive signal. Therefore, even though a difference beat component may occur as a result of the difference between the luminance signal and the clock pulses, the beat component is held still when viewed in terms of the vertical synchronization. Accordingly, a phenomenon in which any possible fringe resulting from the beat component will not move on the screen of the cathode ray tube, which is not comfortable to look, can be substantially eliminated.

In describing the second embodiment of the present invention, the luminance signal has been described as a digitized signal. However, the present invention is not limited thereto, but may be applicable where each of the R, G and B signals are digitized.

Figure 12:
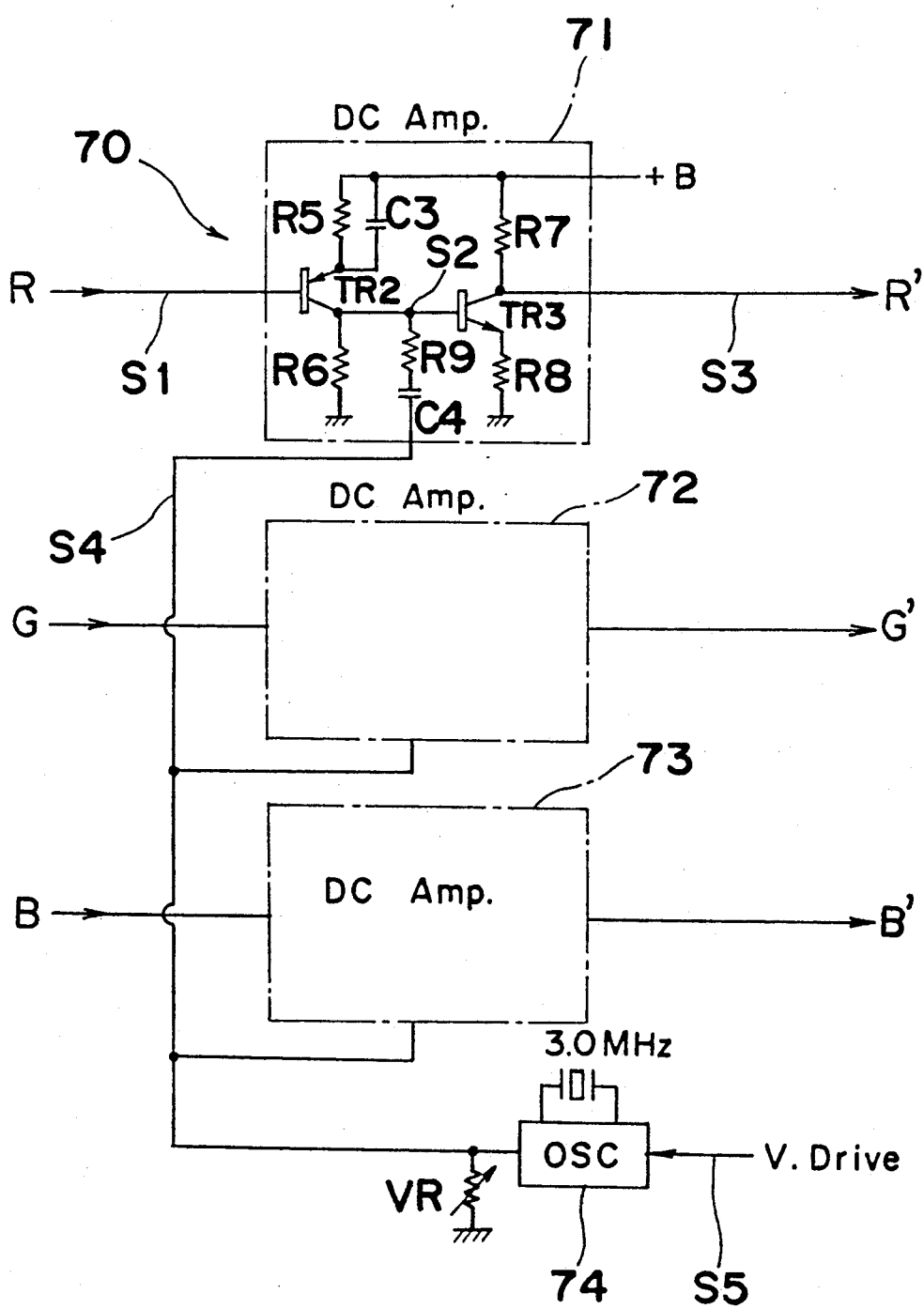
FIG. 12 is a circuit diagram showing the details of the intermediate gradation generator used in the image signal processor of FIG. 11.
Figure 13:
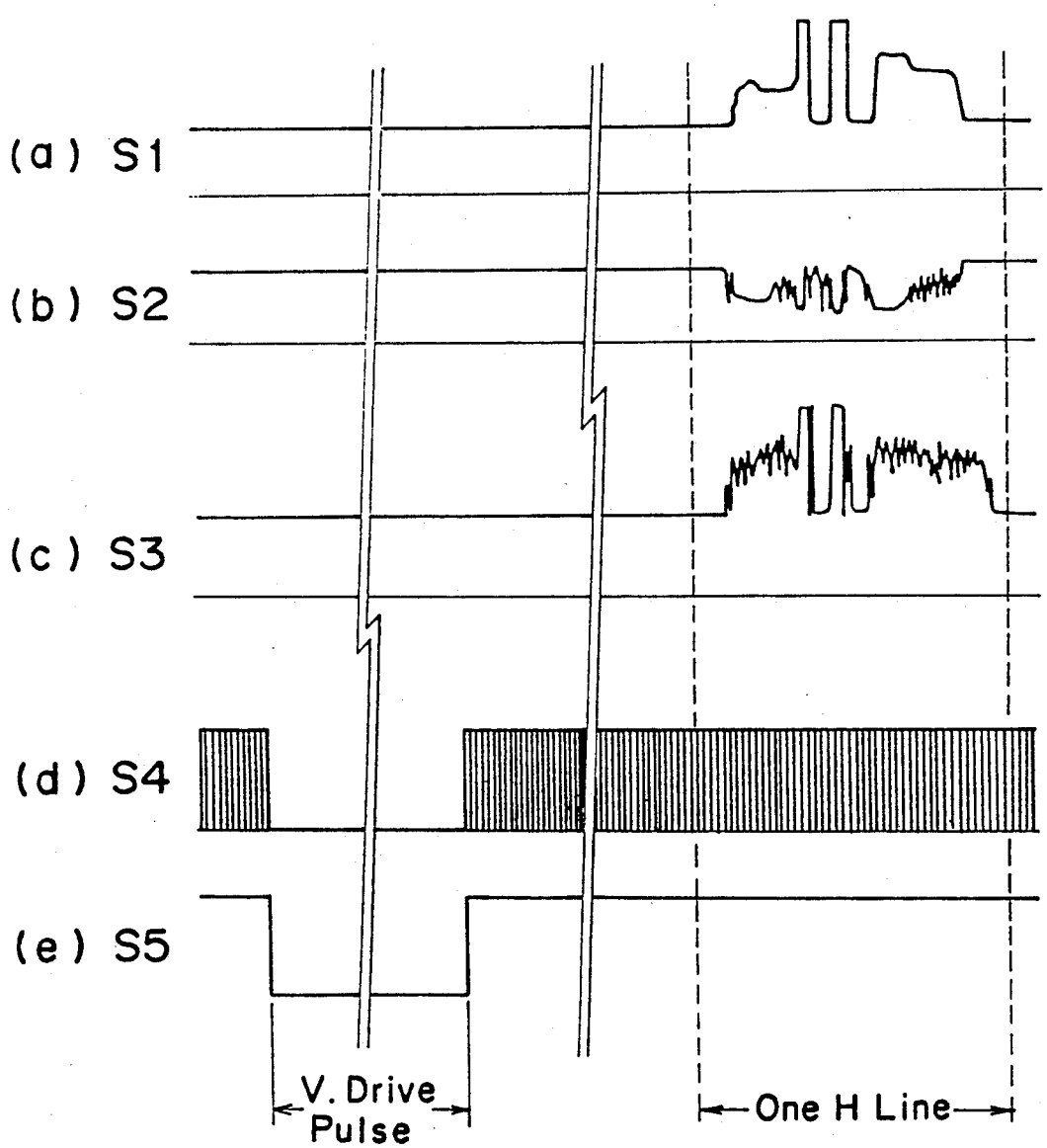
FIG. 13 is a diagram showing waveforms of various signals appearing in the circuit shown in FIG. 12.

The image signal processor according to a third embodiment of the present invention is illustrated in FIGS. 11 to 13. Specifically, FIG. 11 illustrates a circuit block diagram of the image signal processor according to the third embodiment, FIG. 12 illustrates the details of an intermediate gradation generator used in the image signal processor of FIG. 11 and FIG. 13 illustrates respective waveforms of various signals appearing in the circuit of FIG. 12.

Referring first to FIG. 11, the primary color signals, that is, the R, G and B color signals, emerging from the color difference/primary color converter 8 are supplied to an intermediate gradation generator 70 which provides R', G' and B' signal corresponding respectively to the R, G and B color signals having average level portions superimposed with the clock pulses.

As best shown in FIG. 12, the intermediate gradation generator 70 includes three direct current amplifiers 71, 72 and 73 of identical construction. Each DC amplifier 71 to 73 includes a PNP-type transistor TR2 having a base to which the associated primary color signal is applied from the converter 8. The transistor TR2 also has an emitter connected to a power source line +B through a resistor R5 and a capacitor C3 connected in parallel to each other. The collector of the transistor TR2 is grounded through a resistor R6 and is connected to the base of an NPN-type transistor TR3 having its collector connected to the power source line +B through a resistor R7. The emitter of the transistor TR3 is grounded through a resistor R8. The transistor TR3 has its base connected through a direct current inhibiting capacitor C4 and a resistor R9 to a clock pulse generator 74 to which the vertical drive signal is supplied. The clock pulse generator 74 is adapted to generate clock pulses of 3 MHz in frequency and synchronized with the vertical drive signal. A node between an output terminal of the clock pulse generator 74 and the capacitor C4 is grounded through a variable resistor VR.

Referring back to FIG. 11, the R', G' and B' signals outputted from the intermediate gradation generator 70 are supplied respectively to analog-to-digital converters 81, 82 and 83. In each analog-to-digital converter, one analog data for one picture element is converted into 3-bit data. The digital data produced respectively from analog-to-digital converters 81, 82 and 83 are applied and stored in associated memories 91, 92 and 93, respectively. When compared with memory 10 shown in FIG. 1 for the blue data in the embodiment of FIG. 1, the memory 93 shown in FIG. 11 for the blue data substantially has a three times greater capacity. The same can be said for the other two memories 91 and 92. Respective outputs from the memories 91, 92 and 93 are supplied to associated digital-to-analog converters 101, 102 and 103 which provide respective outputs to the external display device, for example, a monitor television receiver.

It is to be noted that the converters 81 to 83, the memories 91 to 93 and the converters 101 to 103 are all controlled by the control unit 14 to which horizontal and vertical synchronizing pulses are supplied from the sync separator 13.

The operation of the image signal processor according to the third embodiment of the present invention shown in and described with reference to FIGS. 11 and 12 will now be described with reference to FIG. 13.

As hereinbefore described, the R, G and B color signals, emerging from the color difference/primary color converter 8 are supplied to an intermediate gradation generator 70 which in turn provides R', G' and B' signals corresponding respectively to the R, G and B color signals having average level portions superimposed with the clock pulses. In FIG. 13, the waveform of only one of the R, G and B signals, for example, that of the R signal which is applied to the DC amplifier 71, is shown by S1 for the purpose of this discussion.

On the other hand, when the vertical drive signal identified by S5 and having such a waveform as shown by signal (e) in FIG. 13 is supplied to the clock pulse generator 74, the latter generates the clock pulses S4 having a waveform as shown by signal (d) in FIG. 13. The clock pulses S4 are, after DC components thereof have been cut out by the action of the capacitor C4, inputted to the base of the transistor TR3. Accordingly, the signal S2 applied to the base of the transistor TR3 has a waveform as shown by signal (b) in FIG. 13, which signal S2 is then inverted by the transistor TR3 to provide the associated R', G' or B' signals S3 which correspond to the inputted color signal having average level portions superimposed with the clock pulses as shown by a waveform (c) in FIG. 13.

It is to be noted that, if the amplitude of the clock pulses is too high, it may happen that the black level will be highlighted or the white level will be faded out with the consequence that the still picture reproduced on the monitor television screen will become grayish. In order to substantially eliminate this problem, it is preferred that the resistance setting of the variable resistor VR be selected to permit the clock pulses to be superimposed on those portions of the input color signal which are of the average level.

The respective R', G' and B' color signals with the clock pulses superimposed thereon are then supplied to the associated analog-to-digital converters 81 to 83 by which they are converted into the 3-bit digital signals. At this time, the sampling frequency is controlled by the control unit 14 to be higher than the frequency (3 MHz) of the clock pulses superimposed on the respective color signals. In the illustrated instance, the sampling frequency employed is 28.636 MHz.

The 3-bit digital signals outputted from the respective converters 81 to 83 are then supplied to the associated memories 91 to 93, and the three bits of each of the digital signals are stored in memory areas 91a, 91b and 91c of the respective memories 91, 92 or 93.

The color signals so stored are read out from the associated memories 91 to 93 in response to the control signal fed from the control unit 14, and converted by the converters 101 to 103 into respective analog signals which are in turn outputted to the monitor television receiver (not shown).

As hereinbefore described, the image signal processing method according to the present invention is such that the clock pulses are superimposed on the portions of the image signal which are of a value substantially equal to the average level and are then sampled out at a timing smaller than the cycle of the clock pulses to provide the image signal to the external display device. Accordingly, any intermediate gradation or color of the original image can be faithfully reproduced.

Moreover, the image signal processor according to the second embodiment of the present invention includes the switching transistors operable to superimpose the clock pulses on the portions of the image signal which are of a value substantially equal to the average level and then to digitize the image signal. The threshold values of the switching transistors need not be varied as required in the conventional Dither method. Therefore, faithful reproduction of the intermediate gradations or colors can be accomplished reliably.

Furthermore, the present invention does not require any process hitherto needed to combine a plurality of digitized images. Therefore, the image signal indicative of the still picture can be outputted on a real-time basis.

The image signal processor according to the third embodiment of the present invention is designed so that the portions of the image signal indicative of the still picture which are of a value substantially equal to the average level of the image signal are superimposed with the clock pulses and are then amplified by direct current. The amplified signal is subsequently sampled out at a timing smaller than the cycle of the clock pulses and then converted into the digital signal for storage in the memory. According to this embodiment of the present invention, since the resolving power of that portion where the clock pulses are superimposed is substantially increased and, therefore, the number of bits of the converters and the memories need not be increased in order to increase the resolving power. Thus, the use of the memory unit of a minimized memory capacity is sufficient for the intermediate gradations and intermediate colors inherent in the original image to be faithfully reproduced.

Figure 14:
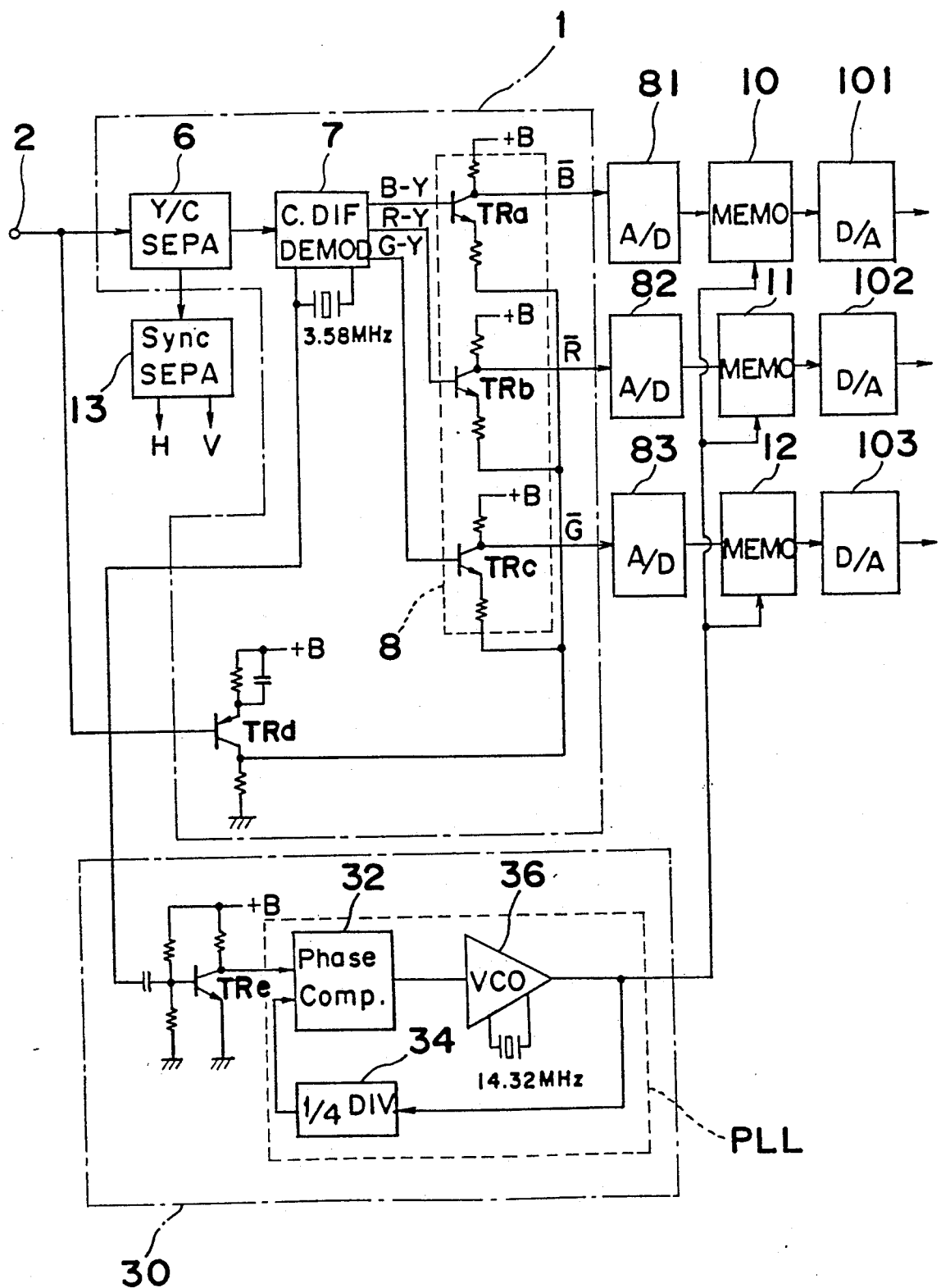
FIG. 14 is a schematic circuit block diagram showing a modified form of the image signal processor.

C-a. Still Picture Data Writing (Modification 1);

Referring to FIGS. 14 and 15 which illustrate the circuit block diagram for a modified form of the image signal processor and respective waveforms of various signals appearing in the circuit of FIG. 14, the image signal processor shown therein basically includes a converter unit 1 operable to modulate the composite color video signal into color difference signals. Also, those color difference signals and the composite color video signal to provide primary color signals on which components of a carrier color signal of 3.58 MHz are superimposed; first to third analog-to-digital converter 81, 82 and 83 which work as digitizing circuits for digitizing the outputs from the converter unit 1 at a predetermined threshold level; a clock pulse generating unit 30 for providing clock pulses synchronized with a color burst signal, included in the composite color video signal and having a frequency n-times (n being a positive integer not smaller than 2) the frequency of the color burst signal; and first to third memories 10, 11 and 12 adapted to receive the clock pulses from the clock pulse generating unit 30 as sampling clock pulses for sampling and storing respective outputs from the first to third converters 81 to 83.

The converter unit 1 includes a Y/C separator 6 for separating the color signals from the composite color video signal applied to the input terminal 2; a color difference signal demodulator 7 for demodulating from the color signals, fed from the Y/C separator 6, color difference signals B-Y, R-Y and G-Y of respective waveforms shown by signals (c), (d) and (e) in FIG. 15; a fourth transistor TRd for inverting and amplifying the composite color video signal to such a waveform as shown by signal (b) in FIG. 15; and a converter having first to third transistors TRa, TRb and TRc which are operable to modulate or matrix the color difference signals B-Y, R-Y and G-Y, fed from the demodulator 7, and the composite color video signal which has been inverted by the transistor TRd. Thereby, respective negative primary color signals $\overline{B}$, $\overline{R}$ and $\overline{G}$ are provided which have been superimposed with the components of the carrier color signal of 3.58 MHz.

The first to third transistors TRa to TRc forming the color difference/primary color converter 8 have their bases, to which the color difference signals B-Y, R-Y and G-Y are applied, respectively, and their emitters to which the inverted composite color video signal is applied. These transistors TRa to TRc output the respective primary color signals $\overline{B}$, $\overline{R}$ and $\overline{G}$ which have been superimposed with the carrier color signal components.

Unlike the embodiments shown and described with reference to FIGS. 6 to 13 and what has been disclosed in each of the Japanese Patent Applications No. 61-98968 and No. 61-272123, in the image signal processor according to the modification now under discussion, the carrier color signal of 3.58 MHz included in the composite color video signal is used as the clock pulses, without the image signal being superimposed with the clock pulses, while use has been made of the converter 8 for providing the primary color signal on which the carrier color signal components have been superimposed.

With the above described construction, a structure to superimpose the clock pulse is not required and, therefore, the image signal processor can be advantageously simplified. Moreover, since the composite color video signal can be applied directly to the emitters of the transistors TRa to TRc without being passed through the Y/C separator, the frequency characteristic of the luminance signal can be improved, as compared with the case in which the Y/C separation is carried out, thereby accomplishing a high quality picture reproduction.

The luminance signal emerging from the Y/C separator 6 is supplied to the sync separator 13 by which synchronizing signals are separated from the luminance signal. The synchronizing signals are then applied to a control unit (not shown) so that the A/D converters 81 to 83, the memories 10 to 12 and the D/A converter 101 to 103 can be controlled by the control unit.

The first to third A/D converters 81 to 83 work to convert the primary color signals $\overline{B}$, $\overline{R}$ and $\overline{G}$, which have been superimposed with the carrier color signal components, into respective digitized signals in a manner which will now be described.

Figure 16:
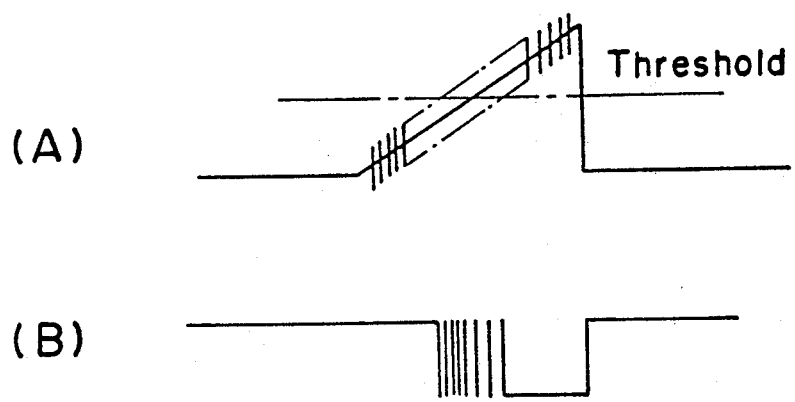
FIG. 16 is a diagram showing waveforms from input and output signals of an analog-to-digital converter used in the circuit of FIG. 14.
Figure 17:
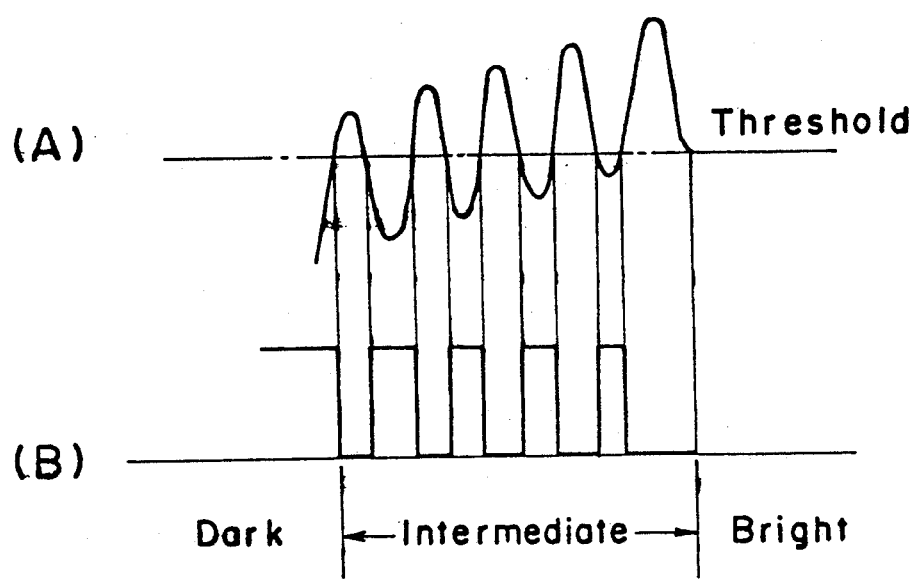
FIG. 17 is a diagram, on a partially enlarged scale, of a portion of the waveform shown in FIG. 16.

FIGS. 16 and 17 illustrate waveforms used to explain how each of the primary color signals is digitized, for example, the blue color signal, with the carrier color signal component superimposed thereon by the analog-to-digital converter 81. When the blue color signal with the carrier color signal component superimposed thereon, having such a waveform as shown by signal (A) in FIG. 16, is supplied to the associated A/D converter 81 having a predetermined threshold level as indicated in FIG. 3, the converter 81 operates to invert the input signal of a higher level than the threshold level into a low level signal and also to invert the input signal of a lower level than the threshold level into a high level signal. Accordingly, when an input signal as shown by the waveform (A) in FIG. 16 is inputted to the associated converter 81, the latter outputs the digitized signal of a waveform shown by signal (B) in FIG. 16.

FIG. 17 illustrates, on an enlarged scale, a portion of the waveform (A) of FIG. 16 in the vicinity of the threshold level and also a portion of the waveform (B) of FIG. 16 corresponding to that portion of the waveform (A) shown in FIG. 17. As can be readily understood from the waveforms (A) and (B) shown in FIG. 17, if the higher level portion of the blue color signal represents a yellow color and the lower level portion of the same blue color signal represents a cyan color, the yellow and cyan colors alternate during a period in which the level of the blue color signal changes from the higher level down to the lower level relative to the predetermined threshold level, thereby representing an intermediate color between the yellow and cyan colors. In this example, since the pulse width (duty ratio) of the carrier color signal component, which is used as the clock pulses, during one cycle thereof progressively varies (varies in a direction in which the pulse width is reduced, in the case of the waveform (B) shown in FIG. 4), with respect to the threshold level, the intermediate gradation correspondingly varies.

In this way, based on the primary color signal with the carrier color signal component superimposed thereon, a so-called quasi-intermediate color can be formed.

On the other hand, the clock pulse generating unit 30 includes a fifth transistor TRe operable to shape the color burst signal supplied from the demodulator 7, and a PLL circuit for generating clock pulses synchronized with the shaped color burst signal and having a frequency four times the frequency of the color burst signal, that is, 14.32 MHz (=3.58×4). This PLL circuit includes a voltage controlled oscillator (VCO) 36 capable of generating clock pulses having a frequency which is four times the frequency of the color burst signal, a divider 34 for dividing the frequency of the output from the oscillator 36 by 4, and a phase comparator 32 for comparing the phase of the output from the divider 34 with that of the color burst signal and for applying an error voltage to the voltage controlled oscillator 36 which corresponds to the phase difference between the output from the divider 34 and the color burst signal.

Each of the memories 10 to 12 is operable to sample out and store the digitized signal from the associated A/D converter with the clock pulses from the generating unit 30 used as sampling clock pulses.

The digitized signals read out from the respective memories 10 to 12 are, after having been converted into the analog signals by the associated digital-to-analog converters 101 to 103, supplied to the external display device (not shown) such as, for example, a monitor television receiver or the personal computer 3.

The sampling clock pulses supplied to each of the memories 10 to 12 are synchronized with the color burst signal and, hence, the carrier color signal components of 3.58 MHz used as the clock pulses superimposed on the primary color signal outputted from the converter unit 1. Therefore, interference fringes resulting from a beat component occurring as a result of the difference between the image signal and the carrier color signal components are stabilized and, therefore, the still picture is reproduced having more viewing comfort. Moreover, since the frequency of the sampling clock pulses is made to be an integer multiple of the frequency of the carrier color signal components, the frequency is, that of the color burst signal, the interference fringes are completely regular and lined up in a longitudinal direction of the television screen. Thereby, the still picture that is reproduced thereon has a greater viewing comfort.

According to the modified form of the image signal processor described above, since the primary color signals which have been superimposed with the carrier color signal components are digitized at respective portions in the vicinity of the threshold levels, the number of bits of the converters and the memories need not be increased in order to increase the resolving power. Thus, the use of the memory unit of a minimized memory capacity is sufficient for the intermediate gradations and colors inherent in the original image to be faithfully reproduced.

Moreover, when the primary color signals having the carrier color signal components superimposed thereon are to be formed, the composite color video signal can be applied directly without being passed through the Y/C separator, the quality of the still picture reproduced can be improved, as compared with the case in which the Y/C separation is carried out.

Figure 18:
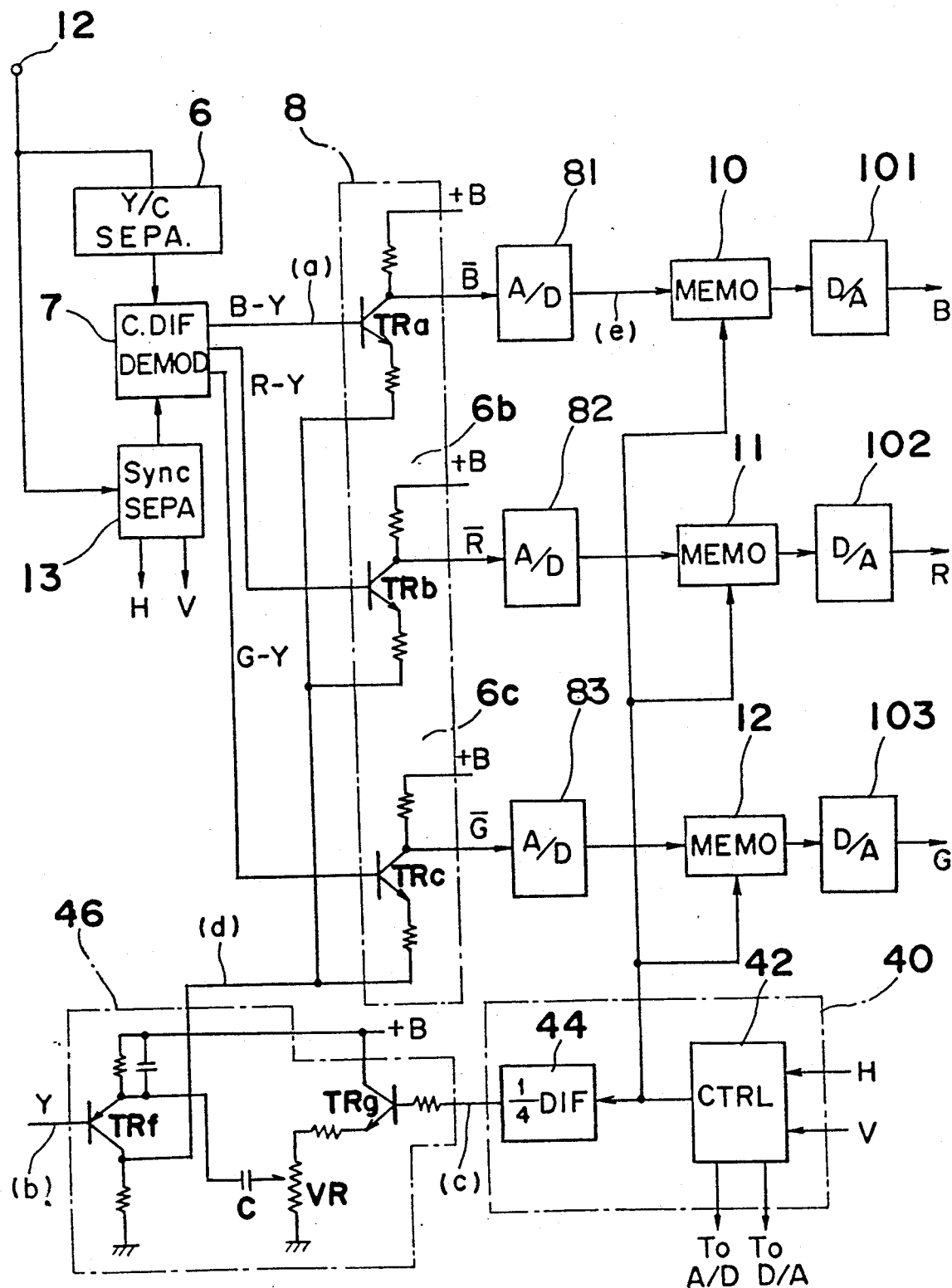
FIG. 18 is a diagram showing a further modified form of the image signal processor.
Figure 19:
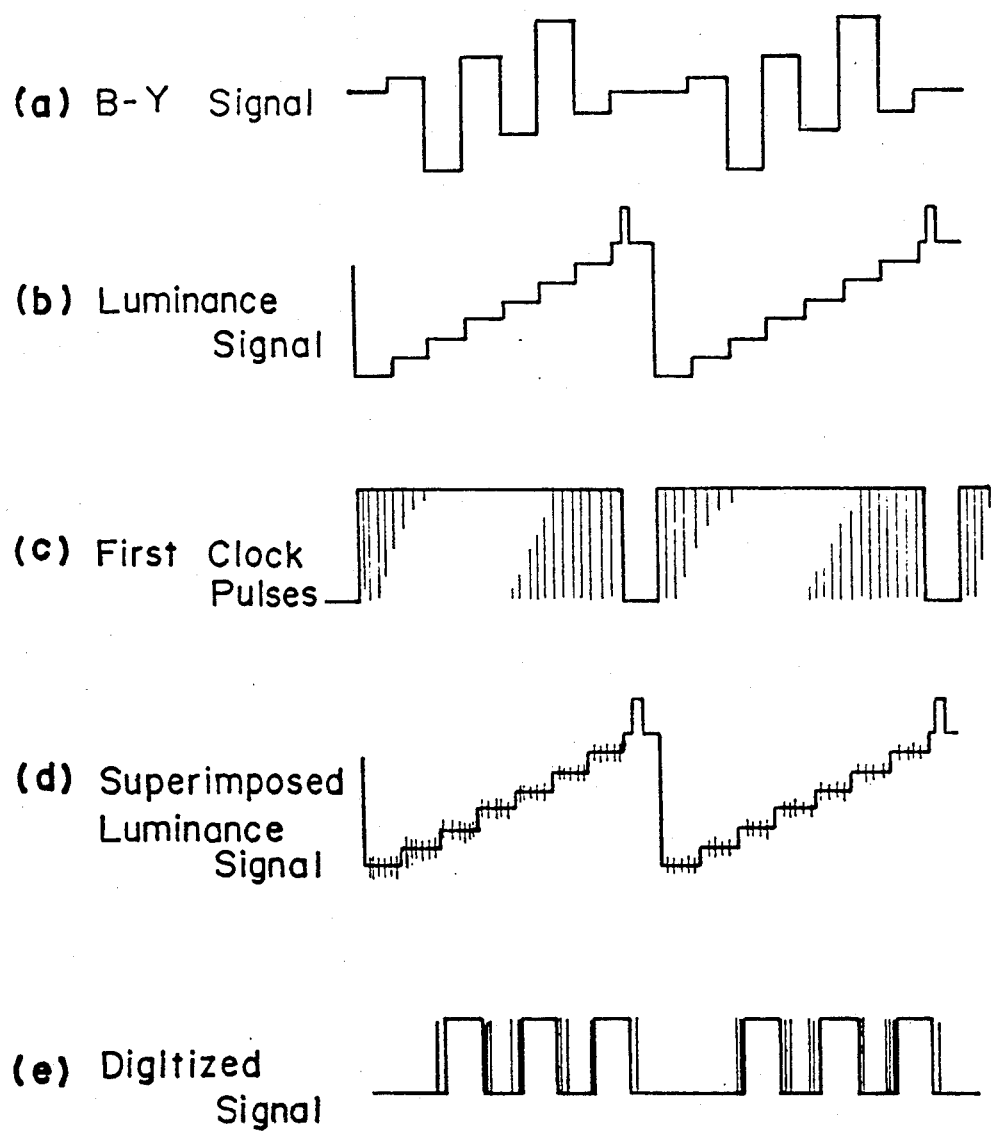
FIG. 19 is a diagram showing waveforms of various signals appearing in the circuit of FIG. 18.

C-b. Still Picture Data Writing (Modification 2):

Referring to FIGS. 18 and 19 which illustrate the circuit block diagram of another modified form of the image signal processor and respective waveforms of various signals appearing in the circuit of FIg. 18, the image signal processor shown therein includes a clock pulse generator 40 having a control unit 42 for generating second clock pulses of 14.318 MHz in frequency which are used as the sampling clock pulses to be applied to the memories 10 to 12 and also for generating clock pulses to be applied to the A/D converters 81 to 83 in a manner as will be described later, and a ¼ divider 44 for dividing the frequency (14.318 MHz) of the second clock pulses by 4 to provide first clock pulses having a frequency of 3.58 MHz. The waveform of the first clock pulses is shown by signal (c) in FIG. 19. Therefore, the second clock pulses are synchronized with the first clock pulses and have a frequency n (n being a positive integer not smaller than 2, for example, n is 4 in this illustrated instance) times the frequency of the first clock pulses.

Reference numeral 46 represents a clock pulse superimposing circuit 5 for superimposing the first clock pulses, supplied from the divider 44 of the clock pulse generating unit 40, on the luminance signal Y for providing a superimposed luminance signal. This superimposing circuit 5 together with the color difference/primary color converter 8, which operates to add the color difference signals B-Y, R-Y and G-Y to the superimposed luminance signal, and the A/D converters 81 to 83 are operable to provide the respective digitized signals, form a quasi-intermediate color generating device. The waveform of the superimposed luminance signal generated from the superimposing circuit 46 is illustrated by signal (d) in FIG. 19 while the luminance signal supplied to the superimposing circuit 46 is illustrated by signal (b) in FIG. 19. Also, one of the color difference signals, for example, the color difference signal B-Y is shown by signal (a) in FIG. 19, and one of the digitized signals, for example, the digitized signal emerging from the A/D converter 81 is shown by signal (e) in FIG. 19.

The clock pulse superimposing circuit 46 includes a transistor TRg having the first clock pulses applied to its base, a variable resistor VRx for adjusting the level of the first clock pulses outputted from the transistor TRf, a DC inhibiting capacitor Cx for cutting off a DC component of the first clock pulses, and a transistor TRf having the luminance signal Y applied to its base, the transistor TRf is operable for superimposing the first clock pulses, applied to the emitter thereof, on the luminance signal Y. The DC inhibiting capacitor Cx improves the frequency characteristics of the image signal. More specifically, the DC inhibiting capacitor C constitutes an emitter-peaking of the transistor TRf. Accordingly, if the capacitance of the capacitor Cx is reduced, a high frequency region of the image signal will be enhanced for highlighting the color of intermediate gradations where a considerable change in picture takes place. Thereby, the quality of the still picture being reproduced is improved.

The color difference/primary color converter 8 includes the first, second and third transistors TRa, TRb and TRc having the respective color difference signals respectively applied to their bases. Also, the superimposed luminance signal, that is, the luminance signal having the first clock pulses superimposed thereon, is applied to their emitters. These transistors TRa to TRc output from their collectors respective added signals in which the superimposed luminance signal and the color difference signals are summed together.

When the added signals from the converter 8 are inputted to the respective A/D converters 81 to 83, the added signals are converted by the converters 81 to 83 into respective digitized signals of a waveform shown by signal (e) in FIG. 19.

The memories 10 to 12 and the D/A converters 101 to 103 respectively operate similar to the manner described in connection with the previous modified form of the image signal processor shown and described by FIG. 14.

The image signal processor of the construction described hereinabove with reference to FIG. 18 operates in the following manner. For the purpose of simplification, reference will be made only to the color difference signal B-Y in describing the operation of the image signal processor. However, it is noted that the following description can be equally applicable to the other color difference signals R-Y and G-Y.

The color difference signal B-Y outputted from the demodulator 7 has a waveform shown by signal (a) in FIG. 19 and is applied to the base of the transistor TRa.

On the other hand, the second clock pulses from the control unit 42 are divided by the divider 44 to provide the first clock pulses of the waveform shown by signal (c) in FIG. 19. The first clock pulses emerging from the divider 44 are supplied to the emitter of the transistor TRf through the base-emitter path of the transistor TRg and then through the DC inhibiting capacitor Cx. The transistor TRf has the luminance signal of the waveform, shown by signal (b) in FIG. 19, applied to its base. Therefore, the superimposed luminance signal emerge is developed from the collector of the transistor TRf. The superimposed luminance signal develops a waveform shown by signal (d) in FIG. 19. This superimposed luminance signal outputted from the transistor TRf is supplied to the emitter of the transistor TRa of the color converter 8.

Since the color difference signal B-Y and the superimposed luminance signal Y are summed together by the transistor TRa, the transistor TRa outputs the blue color signal B on which the clock pulses have been superimposed from its collector. This blue color signal B is then digitized by the associated A/D converter 81 into the digitized signal having the waveform (e) shown in FIG. 19.

Figure 20:
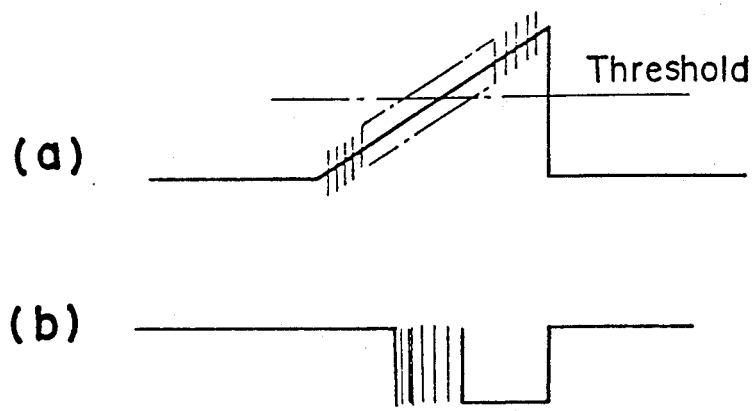
FIGS. 20 and 21 are diagrams respectively similar to FIGS. 16 and 17, respectively but pertaining to the image signal processor of FIG. 18.

FIG. 20 illustrates waveforms used to explain how the blue color signal having the clock pulses superimposed thereon is digitized by the analog-to-digital converter 81. When the blue color signal having the clock pulses superimposed thereon as shown by the waveform (a) in FIG. 20 is supplied to the A/D converter 81 having a predetermined threshold level as indicated in FIG. 20, the converter 81 operates to invert the input signal of a higher level than the threshold level into a low level signal. Also, the input signal of a lower level than the threshold level is inverted into a high level signal. Accordingly, when the input signal shown by the waveform (a) in FIG. 20 is inputted to the converter 81, the digitized signal of the waveform (b) shown in FIG. 20 is outputted from the converter.

Figure 21:
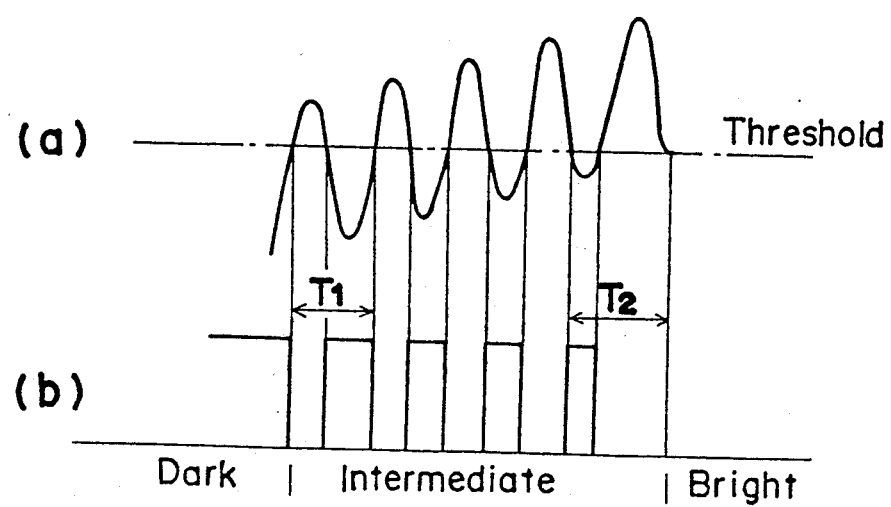

FIG. 21 illustrates, on an enlarged scale, a portion of the waveform (a) of FIG. 20 in the vicinity of the threshold level and a portion of the waveform (b) of FIG. 20 corresponding to that portion of the waveform (a) shown in FIG. 21. As can be readily understood from the waveforms (a) and (b) shown in FIG. 21, if the higher level portion of the blue color signal represents a yellow color and the lower level portion of the same blue color signal represents a cyan color, the yellow and cyan colors alternate during a period in which the level of the blue color signal changes from the higher level down to the lower level relative to the predetermined level. Thereby, thereby an intermediate color between the yellow and cyan colors is represented. In this example, since the pulse width (duty ratio) of the carrier color signal component, which is used as the clock pulses, during one cycle thereof progressively varies (varies in a direction which reduces the pulse width, in the case of the waveform (b) shown in FIG. 21) with respect to the threshold level, the intermediate gradation correspondingly varies.

The second clock pulses emerging from the control unit 42 are supplied onto only to the divider 44, but also to the memories 10 to 12 as the respective sampling clock pulses. In response to the sampling clock pulses, the memories 10 to 12 store and process the respective outputs from the A/D converters 81 to 83. The color signals stored in the associated memories 10 to 12 are, in response to the control signal from the control unit 42, outputted to the associated D/A converters 101 to 103 from which the analog signals are outputted to the external display device for the reproduction on a screen of the cathode ray tube.

In the modification shown and described by FIG. 18, since the sampling clock pulses supplied to the memories 10 to 12 and the first clock pulses to be superimposed on the luminance signal are synchronized with each other, any possible interference fringe which would appear on the television screen as a result of a beat component between the luminance signal and the clock pulses can be advantageously stabilized. In addition, since the sampling clock pulses are selected as to have a frequency four times the frequency of the first clock pulses, the interference fringes will be lined up in a longitudinal direction of the screen, permitting the reproduced still picture to be comfortably viewed.

It is to be noted that the inversion of the phases of the clock pulses for each horizontal scanning line may render the interference fringes to be arranged in a grid shape for permitting a more comfortable viewing of the still picture reproduced.

Even the image signal processor shown and described by FIG. 18 can bring about such advantages and effects as hereinbefore described in connection with any one of the foregoing embodiments.

Although the present invention has fully been described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

What is claimed is:

1. An image signal processor comprising:
input means for receiving a composite video signal, said composite video signal having a vertical synchronizing signal;
memory means for storing a plurality of image signals representative of a picture during one field period of said composite video signal;
read operating means for generating READ-OUT control signals necessary to read out said plurality of image signals stored in said memory means in response to a READ-OUT command signal;
write operating means for generating WRITE-IN control signals necessary to write said plurality of image signals in said memory means;
switching means, operatively connected to said read operating means and said write operating means, for receiving said READ-OUT control signals and said WRITE-IN control signals and for selecting either said WRITE-IN control signals or said READ-OUT control signals to be outputted to said memory means; and
switching control means for generating a control signal to control the selection of said switching means;
said switching control means receiving said READ-OUT command signal and said vertical synchronizing signal and producing said control signal in response to said READ-OUT command signal and in synchronism with said vertical synchronizing signal.

2. An image signal processor according to claim 1, wherein said input means comprises:
luminance signal separating means for separating said composite video signal into a luminance signal and a color signal;
color difference signal demodulating means for developing first, second and third color difference signals from said color signal; and
primary color converting means for converting said first, second, and third color difference signals into first, second, and third primary color signals.

3. An image signal processor according to claim 2, wherein said memory means comprises first, second, and third field memories for storing said first, second, and third primary color signals, respectively.

4. An image signal processor according to claim 1, wherein said read operating means comprises:
a personal computer for generating said READ-OUT command signal; and
a READ-OUT control circuit for generating said READ-OUT control signals in response to said READ-OUT command signal.

5. An image processor according to claim 2, wherein said write operating means comprises:
a WRITE-IN clock signal oscillator for developing a clock signal;
synch separating means for developing synchronizing signals in response to said luminance signal from said luminance signal separating means; and
a WRITE-IN control circuit for generating said WRITE-IN control signals in response to said clock signal and said synchronizing signals.

6. An image signal processor according to claim 1, wherein said switching means selecting said READ-OUT control signals in synchronism with said vertical synchronizing signals.

7. A method for reading and writing a composite video signal in an image processor, comprising the steps of:
(a) receiving a composite video signal having a vertical synchronizing signal;
(b) storing a plurality of image signals representative of a picture during one field period of the composite video signal in a memory;
(c) generating READ-OUT control signals for controlling a reading out of the plurality of image signals stored in the memory in response to a READ-OUT command signal;
(d) generating WRITE-IN control signals for controlling a writing of the plurality of image signals into the memory; and
(e) selecting either the READ-OUT control signals or the WRITE-IN control signals to be applied to the memory through a switch, thereby causing the selection of the READ-OUT control signals to take place after receiving the READ-OUT command signal and in synchronism with the vertical synchronizing signal of the composite video signal.

* * * * *